US010701438B2

(12) United States Patent
Stigall et al.

(10) Patent No.: US 10,701,438 B2
(45) Date of Patent: Jun. 30, 2020

(54) AUTOMATIC CONTENT RECOGNITION AND VERIFICATION IN A BROADCAST CHAIN

(71) Applicant: Turner Broadcasting System, Inc., Atlanta, GA (US)

(72) Inventors: Gregory McClain Stigall, Douglasville, GA (US); Nishith Kumar Sinha, Mableton, GA (US)

(73) Assignee: TURNER BROADCASTING SYSTEM, INC., Atlanta, GA (US)

( * ) Notice: Subject to any disclaimer, the term of this patent is extended or adjusted under 35 U.S.C. 154(b) by 0 days.

(21) Appl. No.: 15/396,596

(22) Filed: Dec. 31, 2016

(65) Prior Publication Data
US 2018/0192119 A1    Jul. 5, 2018

(51) Int. Cl.
*H04N 21/44* (2011.01)
*H04N 21/234* (2011.01)
(Continued)

(52) U.S. Cl.
CPC .. *H04N 21/44008* (2013.01); *H04N 21/23418* (2013.01); *H04N 21/4316* (2013.01); *H04N 21/4886* (2013.01)

(58) Field of Classification Search
CPC ......... H04N 21/23418; H04N 21/4316; H04N 21/44008; H04N 21/4886
See application file for complete search history.

(56) References Cited

U.S. PATENT DOCUMENTS

| 5,305,464 A | 4/1994 | Frett |
|---|---|---|
| 5,410,326 A | 4/1995 | Goldstein |
| (Continued) | | |

FOREIGN PATENT DOCUMENTS

| EP | 1354276 | 12/2007 |
|---|---|---|
| EP | 1485815 | 10/2009 |
| (Continued) | | |

OTHER PUBLICATIONS

Blackburn, Steven G., "Content Based Retrieval and Navigation of Music," University of Southampton Faculty of Engineering and Applied Science, Department of Electronics and Computer Science, Mar. 10, 1999.
(Continued)

*Primary Examiner* — Pinkal R Chokshi
(74) *Attorney, Agent, or Firm* — Chip Law Group

(57) ABSTRACT

A graphics verification system that handles content of a channel in a broadcast chain, partitions an on-screen view of the channel into a plurality of sections based on an overlay of a plurality of graphics on the on-screen view of the channel. The content may comprise media content and may include video, audio and/or ancillary data that is associated with any portion of a particular content. A placement of each of the overlaid plurality of graphics in the plurality of sections is determined with respect to associated content on the on-screen view of the channel. The placement is determined based on a concurrent look-up of the overlaid plurality of graphics in the plurality of sections and the associated content. The concurrent look-up is based on fingerprints or watermarks of the plurality of graphics and the associated content. One or more error parameters are detected based on the determined placement. The on-screen view of the channel is calibrated prior to multicasting of the channel, based on the one or more detected error parameters.

31 Claims, 7 Drawing Sheets

(51) Int. Cl.
  *H04N 21/431* (2011.01)
  *H04N 21/488* (2011.01)

(56) References Cited

U.S. PATENT DOCUMENTS

| | | |
|---|---|---|
| 5,437,050 A | 7/1995 | Lamb et al. |
| 5,712,995 A | 1/1998 | Cohn |
| 5,874,686 A | 2/1999 | Ghias et al. |
| 5,918,223 A | 6/1999 | Blum et al. |
| 5,956,683 A | 9/1999 | Jacobs et al. |
| 5,991,737 A | 11/1999 | Chen |
| 6,121,530 A | 9/2000 | Sonoda |
| 6,184,877 B1 | 2/2001 | Dodson et al. |
| 6,201,176 B1 | 3/2001 | Yourlo |
| 6,314,577 B1 | 11/2001 | Pocock |
| 6,408,272 B1 | 6/2002 | White et al. |
| 6,504,089 B1 | 1/2003 | Nagasawa et al. |
| 6,556,218 B1 | 4/2003 | Alcorn |
| 6,760,720 B1 | 7/2004 | De Bellis |
| 6,765,595 B2 | 7/2004 | Lee et al. |
| 6,834,308 B1 | 12/2004 | Ikezoye et al. |
| 6,968,337 B2 | 11/2005 | Wold |
| 6,990,453 B2 | 1/2006 | Wang et al. |
| 7,080,325 B2 | 7/2006 | Treibach-Heck et al. |
| 7,095,871 B2 | 8/2006 | Jones |
| 7,134,132 B1 | 11/2006 | Ngo |
| 7,174,293 B2 | 2/2007 | Kenyon et al. |
| 7,190,971 B1 | 3/2007 | Kawamoto |
| 7,194,752 B1 | 3/2007 | Kenyon et al. |
| 7,266,343 B1 | 9/2007 | Yli-juuti et al. |
| 7,363,278 B2 | 4/2008 | Schmelzer et al. |
| 7,444,353 B1 | 10/2008 | Chen et al. |
| 7,500,007 B2 | 3/2009 | Ikezoye et al. |
| 7,529,659 B2 | 5/2009 | Wold |
| 7,562,012 B1 | 7/2009 | Wold et al. |
| 7,562,392 B1 | 7/2009 | Rhoads et al. |
| 7,565,327 B2 | 7/2009 | Schmelzer |
| 7,624,416 B1 | 11/2009 | Vandermolen |
| 7,703,114 B2 | 4/2010 | Thukral |
| 7,707,088 B2 | 4/2010 | Schmelzer |
| 7,711,652 B2 | 5/2010 | Schmelzer |
| 7,730,509 B2 | 6/2010 | Boulet et al. |
| 7,747,749 B1 | 6/2010 | Erikson et al. |
| 7,783,489 B2 | 8/2010 | Kenyon et al. |
| 7,797,249 B2 | 9/2010 | Schmelzer et al. |
| 7,813,954 B1 | 10/2010 | Price |
| 7,870,574 B2 | 1/2011 | Kenyon et al. |
| 7,877,290 B1 | 1/2011 | Arsenault |
| 7,877,438 B2 | 1/2011 | Schrempp et al. |
| 7,900,228 B2 | 3/2011 | Stark et al. |
| 7,917,645 B2 | 3/2011 | Ikezoye et al. |
| 8,006,274 B2 | 8/2011 | Scott, III |
| 8,046,803 B1 | 10/2011 | Lee |
| 8,117,635 B2 | 2/2012 | Hendricks et al. |
| 8,249,422 B2 | 8/2012 | Narahara et al. |
| 8,281,339 B1* | 10/2012 | Walker .................. G06Q 10/00 348/564 |
| 8,335,833 B1 | 12/2012 | Parkinson |
| 8,407,750 B2 | 3/2013 | Vorbau |
| 8,413,206 B1 | 4/2013 | Wyatt et al. |
| 8,418,206 B2 | 4/2013 | Bryant et al. |
| 8,553,148 B2 | 10/2013 | Ramaswamy et al. |
| 8,572,650 B2 | 10/2013 | Townsend et al. |
| 8,732,473 B2 | 5/2014 | Bisso et al. |
| 8,732,739 B2 | 5/2014 | Sillerman |
| 8,793,274 B2 | 7/2014 | Yu et al. |
| 8,810,512 B2 | 8/2014 | Andersson |
| 9,094,618 B1* | 7/2015 | Hundemer ............. H04N 5/268 |
| 2002/0032906 A1 | 3/2002 | Grossman |
| 2002/0069100 A1 | 6/2002 | Arberman |
| 2002/0073419 A1 | 6/2002 | Yen |
| 2002/0078441 A1 | 6/2002 | Drake |
| 2002/0083060 A1 | 6/2002 | Wang et al. |
| 2002/0120925 A1 | 8/2002 | Logan |
| 2002/0133817 A1 | 9/2002 | Markel |
| 2002/0178447 A1 | 11/2002 | Plotnick |
| 2003/0002638 A1 | 1/2003 | Kaars |
| 2003/0035075 A1 | 2/2003 | Butler et al. |
| 2003/0055699 A1 | 3/2003 | O'Connor |
| 2003/0056101 A1 | 3/2003 | Epstein |
| 2003/0101451 A1 | 5/2003 | Bentolila |
| 2003/0149975 A1 | 8/2003 | Eldering |
| 2003/0154475 A1 | 8/2003 | Rodriguez |
| 2003/0172381 A1 | 9/2003 | Janevski |
| 2004/0003397 A1 | 1/2004 | Boston et al. |
| 2004/0003406 A1* | 1/2004 | Billmaier ............. G06F 1/3203 725/60 |
| 2004/0031046 A1 | 2/2004 | Weinblatt et al. |
| 2004/0034874 A1 | 2/2004 | Hord |
| 2004/0068737 A1 | 4/2004 | Itoh et al. |
| 2004/0143349 A1 | 7/2004 | Roberts |
| 2004/0143845 A1 | 7/2004 | Lin |
| 2004/0189710 A1 | 9/2004 | Goulden |
| 2004/0205810 A1 | 10/2004 | Matheny et al. |
| 2004/0210847 A1 | 10/2004 | Berson |
| 2004/0255322 A1 | 12/2004 | Meadows et al. |
| 2005/0022211 A1 | 1/2005 | Veselov et al. |
| 2005/0078223 A1* | 4/2005 | Liu ....................... G06K 9/325 348/701 |
| 2005/0097599 A1 | 5/2005 | Plotnick et al. |
| 2005/0149968 A1 | 7/2005 | Konig |
| 2005/0235307 A1 | 10/2005 | Relan |
| 2005/0278731 A1 | 12/2005 | Cameron |
| 2006/0015923 A1 | 1/2006 | Chuah |
| 2006/0026636 A1 | 2/2006 | Stark et al. |
| 2006/0031684 A1 | 2/2006 | Sharma et al. |
| 2006/0187358 A1 | 8/2006 | Lienhart |
| 2006/0195860 A1 | 8/2006 | Eldering |
| 2006/0282847 A1 | 12/2006 | Gupte |
| 2007/0052854 A1* | 3/2007 | Yeh ....................... G06K 9/2063 348/565 |
| 2007/0078009 A1 | 4/2007 | Lockton |
| 2007/0192784 A1 | 8/2007 | Postrel |
| 2007/0250901 A1 | 10/2007 | McIntire |
| 2008/0064490 A1 | 3/2008 | Ellis |
| 2008/0104634 A1 | 5/2008 | Gajdos et al. |
| 2008/0127253 A1 | 5/2008 | Zhang |
| 2008/0227436 A1 | 9/2008 | Gantman |
| 2008/0244640 A1 | 10/2008 | Belleguie |
| 2008/0250447 A1 | 10/2008 | Rowe et al. |
| 2008/0305815 A1 | 12/2008 | McDonough |
| 2008/0310731 A1 | 12/2008 | Stojancic et al. |
| 2008/0313140 A1 | 12/2008 | Pereira et al. |
| 2009/0009532 A1 | 1/2009 | Hallberg |
| 2009/0064261 A1 | 3/2009 | Jung |
| 2009/0077046 A1 | 3/2009 | Narahara et al. |
| 2009/0077489 A1 | 3/2009 | Homma |
| 2009/0094637 A1 | 4/2009 | Lemmons |
| 2009/0106104 A1 | 4/2009 | Upendran et al. |
| 2009/0119723 A1 | 5/2009 | Tinsman |
| 2009/0133049 A1 | 5/2009 | Bradley |
| 2009/0150930 A1 | 6/2009 | Sherwin et al. |
| 2009/0222754 A1* | 9/2009 | Phillips ................. H04N 21/235 715/774 |
| 2009/0235317 A1 | 9/2009 | Igarashi |
| 2009/0259690 A1 | 10/2009 | Bogdanov |
| 2009/0288113 A1 | 11/2009 | Skinner |
| 2009/0317053 A1 | 12/2009 | Morley |
| 2009/0318114 A1 | 12/2009 | Bertoni |
| 2009/0319522 A1 | 12/2009 | Karstens |
| 2009/0327894 A1 | 12/2009 | Rakib et al. |
| 2010/0007797 A1 | 1/2010 | Stojancic |
| 2010/0043040 A1 | 2/2010 | Olsen |
| 2010/0095337 A1 | 4/2010 | Dua |
| 2010/0121691 A1 | 5/2010 | Shifflett et al. |
| 2010/0125498 A1 | 5/2010 | Jaramillo |
| 2010/0158391 A1 | 6/2010 | Cunningham |
| 2010/0162344 A1 | 6/2010 | Casagrande et al. |
| 2010/0169906 A1 | 7/2010 | Takahashi |
| 2010/0169911 A1* | 7/2010 | Zhang .................... H04H 60/59 725/19 |
| 2010/0175078 A1 | 7/2010 | Knudson |
| 2010/0205627 A1 | 8/2010 | Cesmedziev |
| 2010/0205628 A1 | 8/2010 | Davis et al. |

(56) References Cited

U.S. PATENT DOCUMENTS

| | | | |
|---|---|---|---|
| 2010/0242065 A1 | 9/2010 | Murakami | |
| 2010/0245681 A1 | 9/2010 | Harris | |
| 2010/0269128 A1 | 10/2010 | Gordon | |
| 2010/0303338 A1 | 12/2010 | Stojancic et al. | |
| 2010/0306193 A1 | 12/2010 | Pereira et al. | |
| 2010/0318515 A1 | 12/2010 | Ramanathan et al. | |
| 2010/0325135 A1 | 12/2010 | Chen et al. | |
| 2011/0067046 A1 | 3/2011 | Cox et al. | |
| 2011/0067066 A1 | 3/2011 | Barton | |
| 2011/0078729 A1 | 3/2011 | Lajoie et al. | |
| 2011/0078733 A1 | 3/2011 | Lee | |
| 2011/0088063 A1 | 4/2011 | Ben-Romdhane et al. | |
| 2011/0107363 A1 | 5/2011 | Sanghavi | |
| 2011/0122255 A1 | 5/2011 | Haritaoglu | |
| 2011/0177775 A1 | 7/2011 | Gupta et al. | |
| 2011/0191806 A1 | 8/2011 | Knudson et al. | |
| 2011/0219419 A1 | 9/2011 | Reisman | |
| 2011/0280434 A1 | 11/2011 | Mamidwar et al. | |
| 2011/0283322 A1 | 11/2011 | Hamano | |
| 2011/0283327 A1 | 11/2011 | Zhu | |
| 2011/0289098 A1 | 11/2011 | Oztaskent et al. | |
| 2011/0289114 A1 | 11/2011 | Yu et al. | |
| 2011/0289524 A1 | 11/2011 | Toner | |
| 2011/0307931 A1 | 12/2011 | Shuster | |
| 2011/0311095 A1 | 12/2011 | Archer | |
| 2011/0313856 A1 | 12/2011 | Cohen et al. | |
| 2011/0314491 A1 | 12/2011 | Delidais et al. | |
| 2011/0314495 A1 | 12/2011 | Zenor | |
| 2012/0017236 A1 | 1/2012 | Stafford et al. | |
| 2012/0042334 A1 | 2/2012 | Choi | |
| 2012/0054848 A1 | 3/2012 | Salowey et al. | |
| 2012/0079521 A1 | 3/2012 | Garg et al. | |
| 2012/0096491 A1 | 4/2012 | Shkedi | |
| 2012/0117584 A1 | 5/2012 | Gordon | |
| 2012/0124625 A1 | 5/2012 | Foote | |
| 2012/0144416 A1 | 6/2012 | Wetzer | |
| 2012/0167133 A1 | 6/2012 | Carroll | |
| 2012/0174157 A1 | 7/2012 | Stinson | |
| 2012/0185895 A1 | 7/2012 | Wong et al. | |
| 2012/0185905 A1* | 7/2012 | Kelley | H04N 9/75 725/109 |
| 2012/0192227 A1 | 7/2012 | Fleischman | |
| 2012/0215789 A1 | 8/2012 | Ramanathan | |
| 2012/0246693 A1 | 9/2012 | Iqbal | |
| 2012/0303442 A1 | 11/2012 | Patwa | |
| 2012/0311618 A1 | 12/2012 | Blaxland | |
| 2012/0317240 A1 | 12/2012 | Wang | |
| 2012/0331496 A1 | 12/2012 | Copertino et al. | |
| 2013/0014146 A1 | 1/2013 | Bhatia et al. | |
| 2013/0019262 A1 | 1/2013 | Bhatia et al. | |
| 2013/0047178 A1 | 2/2013 | Moon | |
| 2013/0047180 A1 | 2/2013 | Moon et al. | |
| 2013/0125163 A1 | 5/2013 | Chen et al. | |
| 2013/0132999 A1 | 5/2013 | Pandey | |
| 2013/0162902 A1 | 6/2013 | Musser | |
| 2013/0163957 A1 | 6/2013 | Ikizyan | |
| 2013/0167171 A1 | 6/2013 | Kitazato et al. | |
| 2013/0174191 A1 | 7/2013 | Thompson, Jr. et al. | |
| 2013/0198768 A1 | 8/2013 | Kitazato | |
| 2013/0205315 A1 | 8/2013 | Sinha et al. | |
| 2013/0205316 A1 | 8/2013 | Sinha et al. | |
| 2013/0205318 A1 | 8/2013 | Sinha et al. | |
| 2013/0205319 A1 | 8/2013 | Sinha et al. | |
| 2013/0205335 A1 | 8/2013 | Sinha et al. | |
| 2013/0208942 A1 | 8/2013 | Davis | |
| 2013/0222597 A1 | 8/2013 | Brink | |
| 2013/0239163 A1 | 9/2013 | Kim et al. | |
| 2013/0305335 A1 | 11/2013 | Syed et al. | |
| 2013/0332951 A1 | 12/2013 | Gharaat | |
| 2013/0339999 A1 | 12/2013 | Sangiovanni | |
| 2014/0058732 A1* | 2/2014 | Labsky | G10L 15/30 704/254 |
| 2014/0082659 A1 | 3/2014 | Fife | |
| 2014/0089815 A1 | 3/2014 | Gildfind et al. | |
| 2014/0150022 A1 | 5/2014 | Oh | |
| 2014/0164994 A1 | 6/2014 | Myslinski | |
| 2014/0337880 A1* | 11/2014 | Sorbel | H04N 21/812 725/34 |
| 2016/0073155 A1* | 3/2016 | Subramaniam | H04N 21/4316 725/32 |
| 2016/0261894 A1* | 9/2016 | Li | H04N 21/23418 |
| 2017/0134822 A1* | 5/2017 | Nguyen | H04N 21/4886 |
| 2017/0180795 A1* | 6/2017 | Cremer | H04N 21/23418 |

FOREIGN PATENT DOCUMENTS

| | | |
|---|---|---|
| JP | 2011055201 A | 3/2011 |
| WO | 9517746 | 6/1995 |

OTHER PUBLICATIONS

Blackburn Steven G., "Search by Humming," University of Southampton Faculty of Engineering, Department of Electronics and Computer Science, May 8, 1997.

Ghias, Asif et al, "Query by Humming—Musical Information Retrieval in an Audio Database," ACM Multimedia 95—Electronic Proceedings, Nov. 5-9, 1995, San Francisco, CA.

ProQuest, PR Newswire, New York, "Mobile Music: Comcast Cellular First in U.S. to Trial Breakthrough Interactive Music Service Call CD," Feb. 11, 1999, p. 1.

Taylor, Chuck, "Company Lets Listeners Dial for CDs StarCD Turns Cell Phones Into Radio-Music Storefronts," Billboard: Jun. 26, 1999; 111, 26; General Interest Module, p. 86.

Tseng, Yuen-Hsien, "Content-Based Retrieval for Music Collections," SIGIR99 22nd Annual International ACM SIGIR Conference on Research and Development in Information Retrieval, Berkeley, CA, Aug. 15-19, 1999.

Whittle, Robin, "Future Developments in the Music Market,"Contemporary Music Summit in Canberra Apr. 27, 1995, Apr. 11, 1995.

* cited by examiner

AUTOMATIC CONTENT RECOGNITION AND VERIFICATION IN A BROADCAST CHAIN

CROSS-REFERENCE TO RELATED APPLICATIONS/INCORPORATION BY REFERENCE

This application makes reference to:
U.S. Pat. No. 9,172,994, application Ser. No. 13/730,352; and
U.S. Pat. No. 8,776,105, application Ser. No. 13/730,656.

Each of the above referenced patents is hereby incorporated herein by reference in its entirety.

FIELD OF TECHNOLOGY

Certain embodiments of the disclosure relate to a content recognition system in a broadcast chain. More specifically, certain embodiments of the disclosure relate to a method and system for automatic content recognition and verification in a broadcast chain.

BACKGROUND

Advancements in the television and broadcasting sector have led to the development of various technologies and broadcasting platforms that are changing the way consumers access and view media content. Broadcasting platforms usually refer to the types of networks that are used to deliver the television signal to the viewer. Currently, all the broadcasting platforms, such as analog terrestrial broadcast, digital terrestrial broadcast, direct-to-home satellite broadcast, cable, Internet Protocol (IP), and over-the-top television (OTT), compete and strive to increase their appeal in order to gain wider audience. The television viewing market is no longer exclusively concerned with whether media content services are viewed on a dedicated television or another device capable of playing media content. As a result of penetration of new technologies in the television and broadcasting sector, it is evident that the success of television broadcasting will be dependent on the ability of the network provider to continuously provide enhanced viewer experience with accurate content delivery.

Traditionally, a network provider (network operator) usually decides what shows to air in the upcoming broadcast year and when to air them. A programming schedule defines what to broadcast and when, ensuring an adequate or maximum utilization of airtime. Accordingly, the media content is packaged into brands, or organized along with graphics into channels to be delivered to consumers. Typically, prior to the delivery of the media content to the consumers, the media content is monitored to verify the placement of various content. Currently, such monitoring is done manually for a network channel, thus practically making unfeasible to monitor a large number of channels at the same time. Thus, an advanced system may be required that provides more feasible and practical way of monitoring the media content prior to multicasting of channels that reduces inefficiency in the various operations of a broadcast chain, and ensures accuracy of content that is to be delivered to provide enhanced viewer experience.

Further limitations and disadvantages of conventional and traditional approaches will become apparent to one of skill in the art, through comparison of such systems with some aspects of the present disclosure as set forth in the remainder of the present application with reference to the drawings.

BRIEF SUMMARY OF THE DISCLOSURE

Systems and/or methods are provided for automatic content recognition and verification in a broadcast chain, substantially as shown in and/or described in connection with at least one of the figures, as set forth more completely in the claims.

These and other advantages, aspects and novel features of the present disclosure, as well as details of an illustrated embodiment thereof, will be more fully understood from the following description and drawings.

DETAILED DESCRIPTION OF THE DISCLOSURE

Figure 1A:
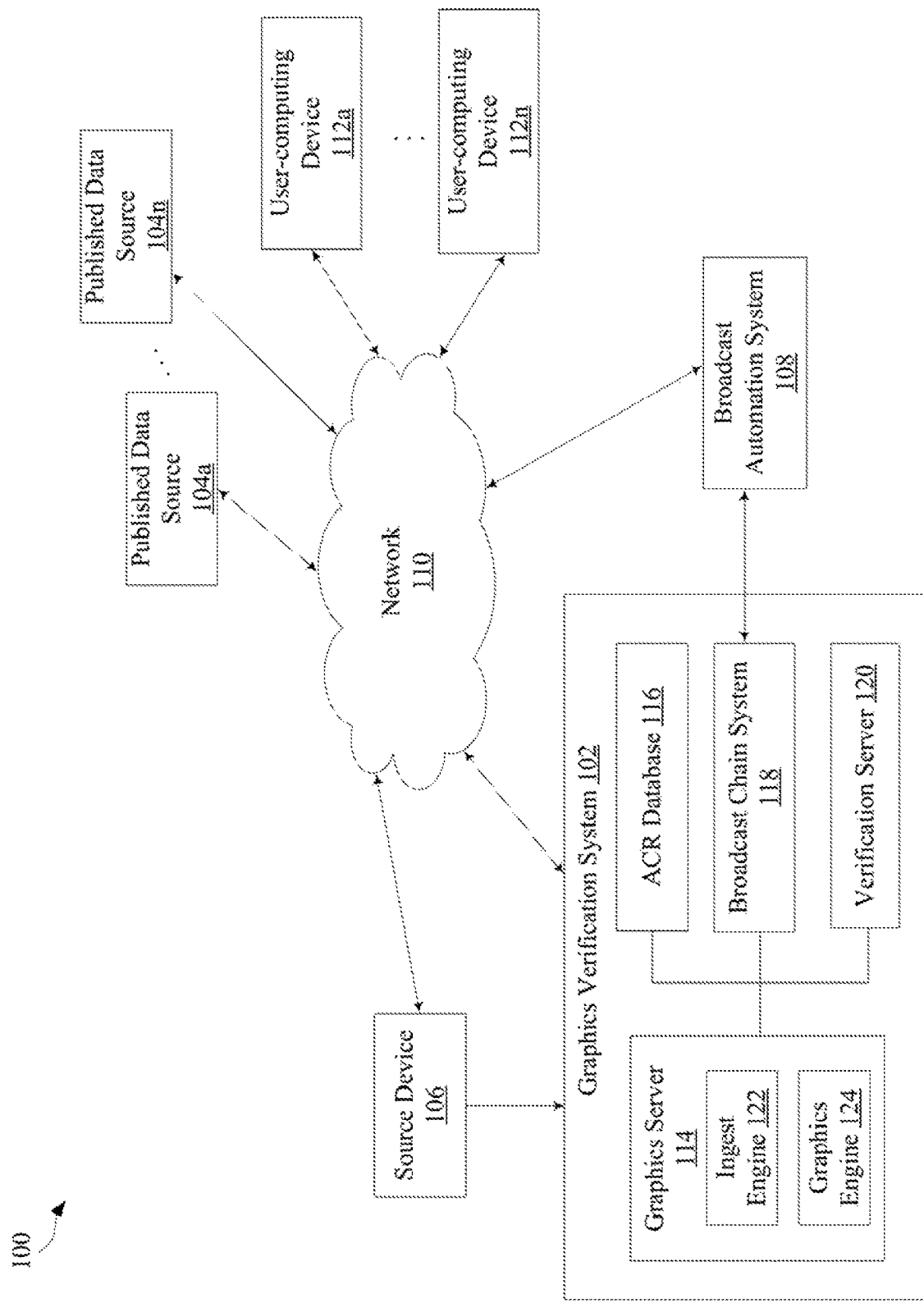
FIG. 1A is a block diagram that illustrates an exemplary system for automatic content recognition and verification in a broadcast chain, in accordance with an exemplary embodiment of the disclosure.

Certain embodiments of the disclosure may be found in a method and system for automatic content recognition and verification in a broadcast chain. Various embodiments of the disclosure provide a method and system that simplifies the content recognition and verification process, and provides the network provider with the capability to automatically monitor placement of various graphics, such as channel logos, full screen graphics, partial screen graphics such as lower one-third graphics, symbol, and the like, on actual content of one or more channels in a broadcast chain. Prior to multicasting of the channel, an on-screen view of the channel is verified in a fail-safe manner to ensure accuracy of the overlaid plurality of graphics on actual content of the channel.

In accordance with various embodiments of the disclosure, a graphics verification system is provided that handles content of a channel in a broadcast chain. Content or media content may comprise video, audio and/or ancillary data that is associated with any portion of a particular content. The graphics verification system may be configured to partition an on-screen view of the channel into a plurality of sections based on an overlay of content, for example, a plurality of graphics on the on-screen view of the channel. The plurality of graphics may comprise a channel logo, a sign, a symbol, full screen graphic, partial screen graphic such as lower one-third graphics, a rating key, a text crawl, and/or a ticker. A placement of each of the overlaid plurality of graphics in the plurality of sections is determined with respect to associated content on the on-screen view of the channel. The placement of each of the plurality of graphics in the plurality of sections with respect to the associated content is determined based on a concurrent look-up of each of the plurality of graphics in the plurality of sections and the associated content. The concurrent look-up is executed to identify correct placement of the plurality of graphics intended for a specific content on the on-screen view of the channel. One or more error parameters are detected on the on-screen view of the channel based on the determined placement of each of the overlaid plurality of graphics in the plurality of sections with respect to the associated content. The on-screen view of the channel is calibrated prior to multicasting of the channel, based on the detected one or more error parameters.

In accordance with an embodiment, the concurrent look-up may be executed based on a graphics identifier (ID) of each of the plurality of graphics in the plurality of sections and a content ID of the associated content of each of the plurality of graphics. The graphics ID may correspond to fingerprints of each of the plurality of graphics. The content ID may correspond to the fingerprints of the associated content.

In accordance with an embodiment, graphics fingerprints, which correspond to the fingerprints of the plurality of graphics, may be generated using a graphics engine. The graphics fingerprints may be generated based on one or more visual features in the plurality of graphics. The graphics fingerprints may be generated for a plurality of coordinates that indicates position of the plurality of graphics on the on-screen view of the channel. The generated graphics fingerprints may be stored in a graphics fingerprint database. In accordance with an embodiment, raster fingerprints may be generated using an ingest engine. The raster fingerprints may be generated based on one or more visual features of the associated content. The generated raster fingerprints may be stored in a content fingerprint database.

In accordance with an embodiment, the fingerprints of the overlaid plurality of graphics detected on the on-screen view of the channel may be compared with the graphics fingerprints stored in the graphics fingerprint database. The comparison may be executed to detect the one or more error parameters of the overlaid plurality of graphics. Based on the detected one or more error parameters of the overlaid plurality of graphics, the overlaid plurality of graphics on the on-screen view of the channel may be automatically corrected at the graphics server.

In accordance with various embodiments of the disclosure, fingerprints of the associated content on which the plurality of graphics are overlaid on the on-screen view of the channel may be compared with the raster fingerprints stored in the content fingerprint database. The comparison may be executed to detect the one or more error parameters related to the associated content.

In accordance with various embodiments of the disclosure, the graphics verification system may utilize a time-based parameter and/or a region-based parameter of a programming schedule to verify each of the plurality of graphics in the plurality of sections and the associated content on the on-screen view. The programming schedule may be determined by a broadcast automation system. The time-based parameter may be indicative of timecodes or timing identifier at which the plurality of graphics and the associated content are required to be overlaid on the on-screen view of the channel during multicasting of the channel. The region-based parameter may be indicative of regions on the on-screen view of the channel, where the plurality of graphics and the associated content are required to be overlaid on the on-screen view of the channel during multicasting of the channel. The regions on the on-screen view of the channel may correspond to the plurality of sections.

In accordance with an embodiment, the graphics verification system may further utilize a plurality of content recognition based inline monitoring devices such as automatic content recognition (ACR)-based inline-monitoring devices placed at a plurality of locations in the broadcast chain, to concurrently detect fingerprints of each of the plurality of graphics in the plurality of sections and the associated content on which the plurality of graphics are overlaid.

FIG. 1A is a block diagram that illustrates an exemplary system for automatic content recognition and verification in a broadcast chain, in accordance with an exemplary embodiment of the disclosure. Referring to FIG. 1A, there is shown a system 100 that comprises a graphics verification system 102 that is communicatively coupled to published data sources 104a, . . . , 104n, a source device 106, and a broadcast automation system 108, via a network 110. There is also shown user-computing devices 112a, . . . , 112n that are communicatively coupled to the network 110. The graphics verification system 102 may comprise a graphics server 114, a content recognition database, for example, an ACR database 116, a broadcast chain system 118, and a verification server 120. The graphics server 114 may comprise an ingest engine 122 and a graphics engine 124.

The graphics verification system 102 may comprise suitable logic, circuitry, and interfaces that may be configured to execute code that handles content of a channel in a broadcast chain. In this regard, the graphics verification system 102 may be configured to automatically recognize the content of the channel in the broadcast chain, verify the recognized content, and thereafter, may trigger an alarm and/or notification that may require human intervention or correct the verified content in the broadcast chain based on any inaccuracy identified during the verification. The graphics verification system 102 may be operated by a broadcasting company, which may be referred to as a broadcast provider (or broadcast operator), or a network provider (or network operator). The broadcast provider may handle a single channel, a plurality of channels, or one or more networks. The broadcast provider may be operable to multicast content via one or more channels, for example, traditional over-the-air broadcast channels, cable television networks, satellite communication networks, the Internet, and/or other content delivery networks (CDNs).

Each of the published data sources 104a, . . . , 104n may be coupled to one or more television networks and may comprise suitable logic, circuitry, and interfaces that may be configured to execute code that provides actual audiences for programs that were aired. As illustrated in FIG. 1A, the published data sources 104a, . . . , 104n are coupled to the graphics verification system 102, via the network 110. An exemplary published data source may be Nielsen. Another exemplary published data source may be a published database that provides ratings for a media item, such as gross rating point (GRP). The GRP is an advertising impact measure or a promotion impact measure for each advertising and/or promotional campaigns, known in the art. In the content production environment in the broadcast chain, when creating content for HTTP Live Streaming (HLS) delivery, ID3 metadata tags are embedded in the HLS stream, which enables monitoring actual audience. Similarly, Nielsen audience measurement systems require that a specific watermark, commonly known as Nielsen watermark, to be embedded to audio or video within a linear broadcast chain, to allow monitoring actual audience.

The source device 106 may comprise suitable logic, circuitry, and interfaces that may be configured to communicate content (for example, a video feed) to the graphics verification system 102. In a broadcast chain, in the content production environment, video and audio data are usually transported using a video serial digital interface (SDI), which is defined by the Society of Motion Picture and Television Engineers (SMPTE). The video SDI supports uncompressed or raw content with superior visual quality. In other embodiments, the video and audio can be transported using SDI or RTP transport mechanisms as defined by the SMPTE ST-2110 family of documents. The source device 106 may be configured to transport (or provide) content to the graphics server 114. The source device 106 may be operated by a broadcasting company, which may be referred to as a broadcast provider (or broadcast operator), or a network provider (or network operator). In accordance with an embodiment, the source device 106 may also be communicatively coupled to the network 110.

The broadcast automation system 108 may comprise suitable logic, circuitry, and interfaces that may be configured to determine a programming schedule. The programming schedule defines what to broadcast and when. Alternatively stated, the programming schedule of a channel defines what media content should be scheduled, the ordering of the media content during playout, and when to multicast. The content that is multicast may include both the programming content, such as TV programs, and the non-programming content, such as advertisements or promotional media. In accordance with an exemplary embodiment, the programming schedule may be a text file or an XML file, that comprise a reference mapping of different media content items, including main content and graphics. The programming schedule may indicate content identifier (ID), graphics ID, and may specify information as to which graphics should be playing with which content, when, and where on an on-screen view of the channel.

The network 110 may be any kind of network, or a combination of various networks, and it is shown illustrating the communication that may occur between the graphics verification system 102, the published data sources 104a, . . . , 104n, the source device 106, the broadcast automation system 108, and the user-computing devices 112a, . . . , 112n. For example, the network 110 may comprise one or more of a cable television network, the Internet, a satellite communication network, a wide area network (WAN), a medium area network (MAN), a local area network (LAN), an analogue terrestrial network, a digital terrestrial network, a direct-to-home satellite network, cable, an Internet Protocol (IP), and an over-the-top television (OTT) network.

Each of the user-computing devices 112a, . . . , 112n may refer to an end-user device where the content (for example, the programming content and/or the non-programming content along with the graphics and the associated content) may be streamed to be viewed by a viewer. The number of impressions of a media item, such as an advertisement and/or promotional media, on the user-computing devices 112a, . . . , 112n may determine the advertising impact or promotion impact and number of actual audiences achieved during campaigns. Examples of the user-computing devices 112a, . . . , 112n may include, but are not limited to, connected TVs, connected TV with paired devices (e.g., tablets), and second screen devices, such as smartphones and tablets.

The graphics server 114 may comprise suitable logic, circuitry, and interfaces that may be configured to receive content from one or more content source devices, such as the source device 106, via one or more communication mediums, such as the network 110. The received content may correspond to a clean version of one or more programs, commercials, promotional media (promos), and/or the like in a certain media format. For example, the received content may be in a material exchange format (MXF) operational pattern 1a (OP1a). In accordance with an embodiment, the received content may further comprise graphics content, closed captions, and/or the like along with the one or more programs, commercials, and/or promotional media (promos). The graphics server 114 be configured to generate fingerprints/watermarks of the received content. The generated fingerprints may then be stored in the ACR database 116. Throughout the disclosure, the term fingerprints and watermarks may be used alternatively. The operations applicable for fingerprints may also be applicable to watermarks without limiting the scope of the disclosure.

The ACR database 116 may comprise suitable logic, circuitry, and interfaces that may be configured to store the fingerprints received from the graphics server 114. The fingerprints may correspond to content fingerprints and graphics fingerprints. The ACR database 116 may be further configured to store an association between the generated fingerprints, content IDs of actual content for which fingerprints (or watermarks) are generated, and/or graphics identifiers (IDs) of graphics for which fingerprints (or watermarks) are generated. The ACR database 116 may be implemented as a distributed and fault-tolerant database that is configured to support persistent storage of fingerprints. The ACR database 116 may be configured to store large amounts of content and/or graphics fingerprints. For example and without limitation, the ACR database 116 may store up to, for example, 25,000 hours of content fingerprints and/or graphics fingerprints. The number of hours of content fingerprints and/or graphics fingerprints that can be stored may vary based on the availability of storage capacity in the ACR database 116.

The broadcast chain system 118 may comprise suitable logic, circuitry, and interfaces that may be configured to generate an output stream of at least the graphics and the associated content that are overlaid on the on-screen view of the channel prior to multicasting of the channel to be viewed on the user-computing devices 112a, . . . , 112n. The broadcast chain system 118 may include a plurality of broadcast chain elements, for example and without limitation, the broadcast chain elements may include a playout server, a graphics server, a closed caption (CC) server, a Nielsen system, an Open Authentication Technology Committee (OATC) and Society of Cable Telecommunications Engineers (SCTE) system, and an encoding server. In some embodiments of the disclosure, the broadcast chain system 118 may be distinct and may not form a part of the graphics verification system 102.

The verification server 120 may comprise suitable logic, circuitry, and interfaces that may be configured to ensure a correct placement of each of the graphics and the associated content that are overlaid in one or more regions (or sections) of the on-screen view of the channel, prior to multicasting of the channel. The verification server 120 may determine a placement of each of the graphics and the associated content in the one or more regions of the on-screen view of the channel. The verification server 120 may further execute a concurrent look-up of each of the graphics and the associated content based on at least the fingerprints of each of the graphics and the associated content stored in the ACR database 116. For example, a check or verification may be performed to determine whether the fingerprints of the overlaid graphics (and the associated content) on the on-screen view of the channel matches with graphics fingerprints (and raster fingerprints) stored in the ACR database 116. The verification server 120 may be further configured to detect one or more error parameters of the overlaid graphics (and the associated content) based on at least the matching. Thereafter, the verification server 120 may automatically trigger and alarm or other notification that may require human intervention or interaction and/or correct the placement of the graphics and/or the associated content in the one or more regions of the on-screen view of the channel, based on the detected one or more error parameters.

The ingest engine 122 may be included in the graphics server 114. The ingest engine 122 may comprise suitable logic, circuitry, and interfaces that may be configured to generate fingerprints of the full raster content received by the graphics server 114, and subsequently, may store the generated fingerprints for archival in a content fingerprint database 128 (described in FIG. 1B). The full raster may correspond to an complete on-screen view of a channel, such as an image frame covering the complete display screen. The ingest engine 122 may generate fingerprints of the content based on at least content characteristics, such as one or more visual features, frame snippets, motion and music changes, camera cuts, brightness level, and object movements. The ingest engine 122 may be further configured to support, among other features, the use of administration tools and the creation of reports, the ability to generate progress reports on processing content and errors, and/or recoverability after a shut down or crash. The ingest engine 122 may be implemented utilizing multiple modules, such as an ACR module (not shown). These modules may be operable to perform one or more functions. Examples of those functions may comprise, but are not limited to, receiving the content to be fingerprinted in an input or watch folder, receiving, and assigning Content IDs and processing priority utilizing content ingest management tools, supporting an ACR process for detecting fingerprints, and communication of fingerprints (or embedded watermarks) to the content fingerprint database 128, and supporting administration tools utilized for monitoring and reporting. The ingest engine 122 may be further configured to provide a management interface for the content fingerprint database 128. For example, an application programming interface (API) may be utilized to remove fingerprints of content from the content fingerprint database 128.

The graphics engine 124 may be included in the graphics server 114. The graphics engine 124 may comprise suitable logic, circuitry, and interfaces that may be configured to use a fingerprint computation or algorithm to generate fingerprints of the graphics using included in the content received by the graphics server 114 from the source device 106, and subsequently, may store the generated fingerprints for archival in graphics fingerprint database 130 (described in FIG. 1B). The graphics may correspond to, for example, a channel logo, a sign, a symbol, full screen graphics, partial screen graphics such as lower one-third graphics, a rating key, and/or a ticker. The graphics engine 124 may be further configured to generate the fingerprints of graphics that are further inserted by a monitoring user 148 (described in FIG. 1B) in the content received by the graphics server 114. The graphics engine 124 may generate graphics fingerprints, which correspond to the fingerprints of the graphics, based on at least graphics characteristics, such as one or more visual features, frame snippets, motion and music changes, camera cuts, brightness level, and object movements. The other functionalities of the graphics engine 124 may be same as that of the ingest engine 122. The graphics server 114 may communicate the coordinate information of the inserted graphics and graphics type to the ACR database 116.

In operation, the graphics verification system 102 may be configured to handle content of a channel in a broadcast chain. The content in the broadcast chain may comprise programming content (such as main program segments of TV shows, TV programs, video-on-demand (VOD) content, and/or the like), non-programming content (such as advertisements, promotional media, or other commercials), graphics, and/or graphics-related content. The graphics server 114 may be configured to receive content (content ingestion) from the source device 106. The received content may correspond to uncompressed SDI format. A playout server in the broadcast chain system 118 may generate a series of on-screen views, for example, a linear stream of the content in an uncompressed SDI format. The series of on-screen views may be generated based on the programming schedule provided by the broadcast automation system 108. The programming schedule may indicate a time-based parameter and/or a region-based parameter. For example, the programming schedule may indicate a start time, an end time of content in the series of on-screen views. The time-based parameter of the programming schedule may be indicative of timecodes or timing identifier at which the content and/or graphics are required to be overlaid on the on-screen view of the channel during multicasting of the channel. In the broadcast chain system 118, a plurality of graphics, closed captions, and/or Nielsen watermarks, may be overlaid (or inserted) in the received content that is in uncompressed SDI format.

In certain locations in the broadcast chain system 118, an ACR-based monitoring may be done. For example, ACR-based inline monitoring devices may be placed at those locations for content monitoring purpose (an example is shown and described in FIG. 1B). Thus, at one or more specified locations in the broadcast chain, the verification server 120 may analyze an on-screen view of the channel prior to multicasting of the channel by the broadcast chain system 118. The on-screen view of the channel may include the plurality of graphics and associated content (e.g., associated graphics-related content) of the plurality of graphics. The plurality of graphics may correspond to a channel logo, a sign, a symbol, lower one-third graphics, a rating key, and/or a ticker. The verification server 120 may be configured to partition the on-screen view of the channel into a plurality of sections. The on-screen view of the channel may be partitioned into the plurality of sections based on an overlay of the plurality of graphics on the on-screen view of the channel. The verification server 120 may be further configured to determine a placement of each of the overlaid plurality of graphics in the plurality of sections with respect to the associated content on the on-screen view of the channel. The placement of each of the plurality of graphics in the plurality of sections may be determined with respect to the associated content of the plurality of graphics, based on a concurrent look-up of each of the plurality of graphics in the plurality of sections and the associated content overlaid on the on-screen view of the channel. The verification server 120 may execute the concurrent look-up based on a graphics identifier (ID) of each of the plurality of graphics in the plurality of sections and a content ID of the associated content of each of the plurality of graphics. The graphics ID may correspond to fingerprints of each of the plurality of graphics. The content ID may correspond to the fingerprints of the associated content of each of the plurality of graphics. Based on the determined placement of each of the overlaid plurality of graphics in the plurality of sections with respect to the associated content on the on-screen view of the channel, the verification server 120 may be configured to verify and identify a correct placement of each of the plurality of graphics intended for a specific content on the on-screen view of the channel. For example, based on at least the determined placement of each of the overlaid plurality of graphics in the plurality of sections with respect to the associated content, one or more error parameters may be detected for each of the plurality of sections with respect to each of the overlaid plurality of graphics in the plurality of sections and the associated content. The verification server 120 may be configured to execute a check to determine whether the fingerprints of the overlaid plurality of graphics on the on-screen view of the channel matches with graphics fingerprints stored in the ACR database 116. The check may be executed at the specified locations in the broadcast chain, where a plurality of ACR-based inline-monitoring devices (hereinafter referred to a plurality of IMDs) are provided, to detect the one or more error parameters of the overlaid plurality of graphics. The check may be executed based on the concurrent look-up, by utilizing a time-based parameter and/or a region-based parameter of a programming schedule determined by the broadcast automation system 108. Based on the detected one or more error parameters of the overlaid plurality of graphics, the overlaid plurality of graphics on the on-screen view of the channel may be automatically corrected (described in FIG. 1B) by the verification server 120. Further, the overlaid plurality of graphics in the plurality of sections of the on-screen view of the channel may be re-verified at a plurality of locations in the broadcast chain. The verification server 120 may utilize the IMDs that are placed at the plurality of locations in the broadcast chain, to re-verify the correct placement of each of the plurality of graphics in the plurality of sections and the associated content. Thus, the verification server 120 ensures accuracy of the overlaid plurality of graphics along with the actual associated content in the plurality of sections of the on-screen view of the channel, prior to multicasting of the channel to be viewed on the user-computing devices 112*a*, . . . , 112*n* by respective one or more users.

Figure 1B:
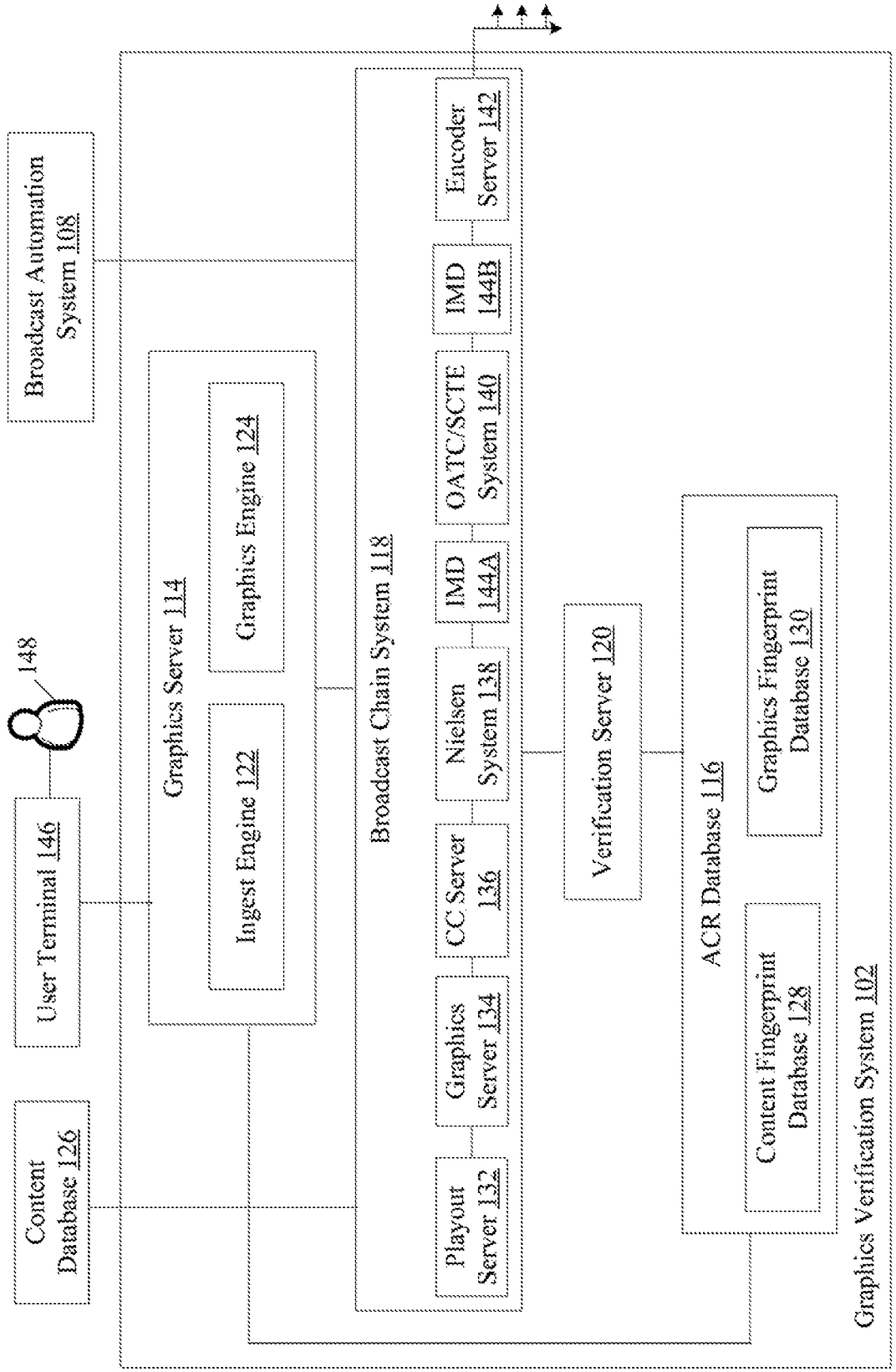
FIG. 1B is a block diagram that illustrates an exemplary graphics verification system for automatic content recognition and verification in a broadcast chain, in accordance with an exemplary embodiment of the disclosure.

FIG. 1B is a block diagram that illustrates an exemplary graphics verification system for automatic content recognition and verification in a broadcast chain, in accordance with an exemplary embodiment of the disclosure. Referring to FIG. 1B, there is shown the graphics server 114, the ACR database 116, the broadcast chain system 118, the verification server 120, as described in FIG. 1A. There is also shown the ingest engine 122 and the graphics engine 124 included in the graphics server 114, as described in FIG. 1A. The ACR database 116 may further comprise a content fingerprint database 128, and a graphics fingerprint database 130, as shown. The broadcast chain system 118 may further comprise a playout server 132, a graphics server 134, a CC server 136, a Nielsen system 138, an OATC/SCTE system 140, and an encoder server 142, as shown. The plurality of IMDs, such as a first IMD 144A and a second IMD 144B, may be placed at certain locations, such as before and after the OATC/SCTE system 140, in the broadcast chain system 118, as shown. There is also shown a content database 126, a user terminal 146, and a monitoring user 148.

In some embodiments of the disclosure, the content fingerprint database 128 and the graphics fingerprint database 130 may be integrated to form an integrated database, for example, the ACR database 116. In some embodiments of the disclosure, as shown, the ingest engine 122, the graphics engine 124, the ACR database 116, the broadcast chain system 118, and the verification server 120 may be integrated to form an integrated system, for example, the graphics verification system 102. In some embodiments of the disclosure, the broadcast chain system 118 may be distinct from the graphics verification system 102. In some embodiments of the disclosure, as shown, the playout server 132, the CC server 136, the Nielsen system 138, the OATC/SCTE system 140, and the encoder server 142 may be integrated to form an integrated system, such as the broadcast chain system 118. In some embodiments of the disclosure, each of the playout server 132, the graphics server 134, the CC server 136, the Nielsen system 138, the OATC/SCTE system 140, and the encoder server 142 may be distinct or provided as an integrated system in the broadcast chain system 118. The functions and/or operations performed by the graphics verification system 102, and its various components, are further described, in FIGS. 2, 3, 4A, 4B, and 5. Other separation and/or combination of the various entities of the exemplary graphics verification system illustrated in FIG. 1B may be done without departing from the spirit and scope of the various embodiments of the disclosure.

The content database 126 may comprise suitable logic, circuitry, and interfaces that may be configured to store the content (i.e., the full raster) and a plurality of graphics. The content database 126 may further store other associated metadata (e.g., program data, frame number, and content timeline, such as time code) that corresponds to the content in the full raster. In accordance with an embodiment, the content database 126 may include the content in uncompressed serial digital interface (SDI) format. The content database 126 may be configured to transmit the content to the broadcast chain system 18 based on the programming schedule.

The content fingerprint database 128 may comprise suitable logic, circuitry, and interfaces that may be configured to store the raster fingerprints (i.e., the fingerprints of the content associated with the actual content). Each content item may be associated with a specific content ID. The content fingerprint database 128 may be further configured to store an association between the fingerprints (or watermarks) and the corresponding content ID. For example, the association between the fingerprints and the corresponding content ID may be stored in the form of a look-up table or a structured data format.

The graphics fingerprint database 130 may comprise suitable logic, circuitry, and interfaces that may be configured to store the graphics fingerprints of a plurality of graphics. The plurality of graphics may correspond to at least a channel logo, a sign, a symbol, lower one-third graphics, a rating key, and/or a ticker. The plurality of graphics may correspond to dynamic graphics (for example, graphics that exhibit motion) and/or static graphics. Each graphics in the plurality of graphics may be associated with a graphics ID. The graphics fingerprint database 130 may be further configured to store an association between the graphic fingerprints and the corresponding graphics ID. For example, the association between the fingerprints and the corresponding graphics ID may be stored in the form of a look-up table or a structured data format.

The playout server 132 may comprise suitable logic, circuitry, and interfaces that may be configured to receive content from one or more content source devices, such as the source device 106 or the content database 126, via one or more communication mediums, such as the network 110. The received content may correspond to one or more programs, commercials, promotions, graphics-related content, and/or the like. The playout server 132 may further generate a series of on-screen views, for example, a linear stream of the content in an uncompressed SDI format. Each on-screen view may include the content without Nielsen watermarks. The series of on-screen views may be generated based on the programming schedule provided by the broadcast automation system 108. The programming schedule may indicate a time-based parameter and/or a region-based parameter. For example, the programming schedule may indicate a start time, an end time of content in the series of on-screen views. The time-based parameter of the programming schedule may be indicative of timecodes or timing identifier at which the content and/or graphics are required to be overlaid on the on-screen view of the channel during multicasting of the channel. The region-based parameter of the programming schedule may be indicative of specific regions or sections on the on-screen view of the channel where the content and/or graphics are required to be overlaid. The playout server 132 may further communicate the on-screen view to the graphics server 134.

The graphics server 134 may comprise suitable logic, circuitry, and interfaces that may be configured to receive the on-screen view comprising the content from the playout server 132. The graphics server 134 may be configured to insert the plurality of graphics on the on-screen view of the channel. The plurality of graphics may be inserted on the on-screen view based on the time-based parameter and/or the region-based parameter in the programming schedule. For example, the plurality of graphics may be overlaid on the on-screen view of the channel during multicasting of the channel at the timecodes or timing identifier indicated by the time-based parameter in the programming schedule. The plurality of graphics may be overlaid at specific regions or sections on the on-screen view of the channel indicated by the region-based parameter of the programming schedule. The plurality of graphics to be overlaid on the on-screen view may be extracted from the content database 126. In another embodiment, the plurality of graphics may be retrieved from the graphics engine 124 (or from specified locations as indicated by a file path or a Uniform Resource Locator (URL) in the programming schedule). Based on the insertion of the plurality of graphics on the on-screen view of the channel, the graphics server 134 may communicate the on-screen view to the CC server 136.

The CC server 136 may comprise suitable logic, circuitry, and interfaces that may be configured to receive the on-screen view comprising the content and the plurality of graphics from the graphics server 134. The CC server 136 may be configured to insert closed caption, for example, sub-title, on the on-screen view of the channel. The closed caption may be inserted based on the content associated with the on-screen view and/or the programming schedule. Further, the closed caption may be determined in real-time or non-real time based on at least the content associated with the on-screen view, by the CC server 136. The CC server 136 may further communicate the on-screen view to the Nielsen system 138.

The Nielsen system 138 may comprise suitable logic, circuitry, and interfaces that may be configured to receive the on-screen view of the channel from the CC server 136. The Nielsen system 138 may be configured to apply (or embed) Nielsen watermarks in the content associated with the on-screen view of the channel. For example, in linear broadcast chain, the Nielsen system 138 may append watermarks to audio content and/or video content associated with the on-screen view. Such Nielsen watermarks may be used to track the linear broadcast's audience. The Nielsen system 138 may further communicate the on-screen view to the OATC/SCTE system 140.

The OATC/SCTE system 140 may comprise suitable logic, circuitry, and interfaces that may be configured to execute code that handles insertion of triggers, such as SCTE-104-based digital ad-marker, in the content overlaid on the on-screen view. In this regard, the OATC/SCTE system 140 may be configured to insert the triggers as per society of motion picture and television engineers (SMPTE) 2010 standards. The triggers may include a pre-roll value, which indicates splice points related to a plurality of interstitial content items (e.g., advertisements and/or promotional media). The splice points may refer to points of transition from one interstitial content item to another interstitial content item or from main program segments to an interstitial content item. The OATC/SCTE system 140 may further communicate the on-screen view to the encoder server 142.

The encoder server 142 may comprise suitable logic, circuitry, and interfaces that may be configured to execute code that handles encoding of the content on the on-screen view of the channel. The encoder server 142 may encode the content by varying bitrates. The encoder server 142 may further convert the SCTE-104-based digital ad-marker to an SCTE-35-based digital ad-marker during encoding. The encoder server 142 further conditions the encoded content on the on-screen view to ensure correct splicing in the content. The encoded content may be multiplexed and communicated (or stored), via the network 110, for the playout, and finally delivered (multicast) to be viewed on the user-computing devices 112a, ..., 112n.

The plurality of IMDs, such as the first IMD 144A and the second IMD 144B, may comprise suitable logic, circuitry, and interfaces that may be configured to execute code to read the inserted/embedded fingerprints (and/or watermarks), and communicate the information to the verification server 120. The plurality of IMDs, such as the first IMD 144A and the second IMD 144B in association with the verification server 120 ensures a correct overlay (i.e., placement) of each of the plurality of graphics and the associated content in the various sections of the on-screen view of the channel. The verification server 120 may be configured to execute a concurrent look-up based on at least the fingerprints of each of the plurality of graphics and the associated content in the various sections of the on-screen view, by use of the plurality of IMDs. The plurality of IMDs may be placed at a plurality of locations in the broadcast chain system 118, for example, between the Nielsen system 138 and the OATC/SCTE system 140 or the OATC/SCTE system 140 and the encoder server 142, as shown. It should be understood that the plurality of IMDs may be placed at other locations, for example, after the encoder server 142, for content and graphics monitoring, without limiting the scope of the disclosure.

The user terminal 146 may comprise a keypad, display, speaker, microphone, a pointing or navigation device and/or capability to enable a user, such as the monitoring user 148 to interact with the graphics server 114 and/or one or more elements of the broadcast chain system 118. The user terminal 146 may be configured to present a user interface that enables the monitoring user 148, such as a graphic inserter to configure and interact with components such as the graphics server 114 and/or the graphics server 134. The functions and/or operations performed by the graphics verification system 102, and its various components, are further described, in FIGS. 2, 3, 4, and 5.

Figure 2:
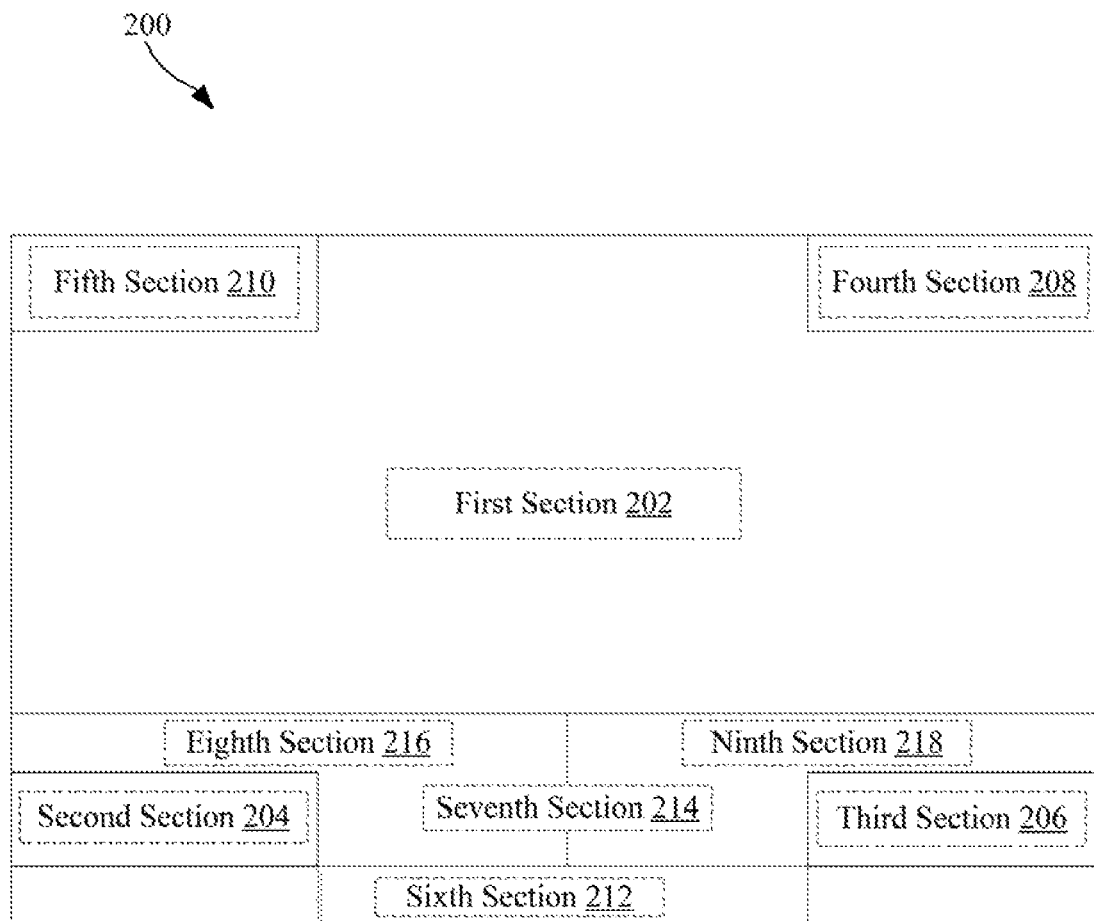
FIG. 2 is a block diagram that illustrates an exemplary on-screen view comprising a plurality of sections, in accordance with an exemplary embodiment of the disclosure.

FIG. 2 is a block diagram that illustrates an exemplary on-screen view comprising a plurality of sections, in accordance with an exemplary embodiment of the disclosure. Referring to FIG. 2, there is shown an on-screen view that comprises a plurality of sections, for example, a first section 202, a second section 204, a third section 206, a fourth section 208, a fifth section 210, a sixth section 212, a seventh section 214, an eighth section 216, and a ninth section 218. The plurality of sections on the on-screen view may be defined by a broadcasting company, which may be referred to as a broadcast provider (or broadcast operator), or a network provider (or network operator). The plurality of sections, as shown, on the on-screen view is for illustrative purpose and should not be construed to limit the scope of the disclosure.

The first section 202 may represent a main portion of the on-screen view. The first section 202 may comprise main content, for example, a programming and/or non-programming content without any overlaid graphics, for example. The second section 204 and the third section 206 may overlap the seventh section 214, as shown, and may comprise, for example, overlays, logos, graphics, and/or other elements or related content. The fourth section 208 and the fifth section 210 may be located at the top of the main portion of the on-screen view, as shown, and may usually comprise, for example, overlays, logos, graphics, symbol, sign, and/or other elements or related content. The sixth section 212 may overlap the seventh section 214, as shown, and may comprise content, for example, tickers or text crawl. The seventh section 214 may comprise the lower one-third (⅓) graphics. The lower one-third graphics is a graphics overlay that may be placed in the title-safe lower area of the on-screen view, and may include other sections, as shown. In its simplest form, the lower one-third graphics may correspond to text content overlying a video stream. The lower one-third graphics may further comprise graphical elements, such as boxes, images or shading. Some lower one-third graphics may include animated backgrounds. The eighth section 216 and the ninth section 218 may overlap the seventh section 214, as shown, and may comprise, for example, headlines, overlays, logos, graphics, and/or other elements or related content.

Figure 3:
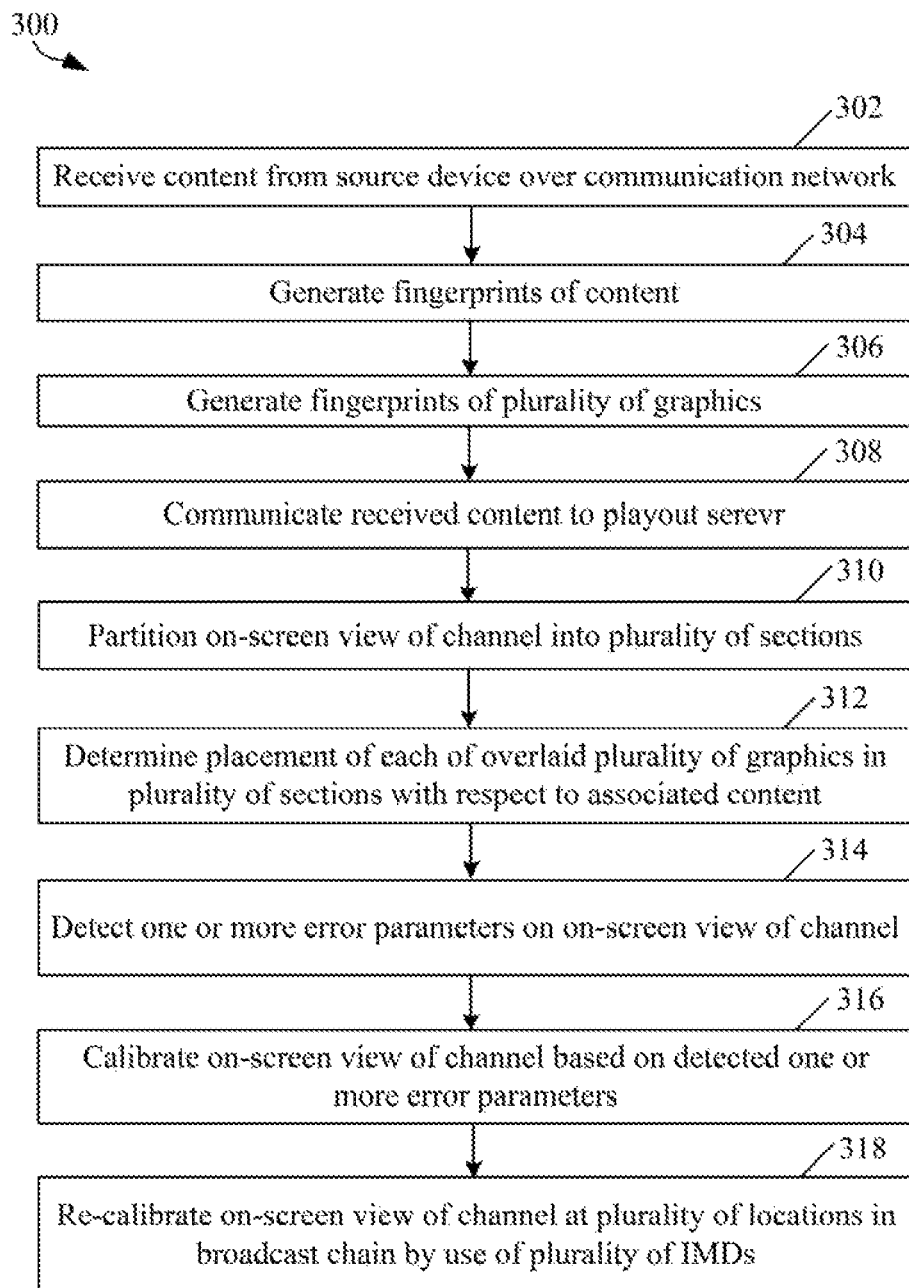
FIG. 3 is a flow chart illustrating exemplary operations for automatic content recognition and verification in a broadcast chain by the graphics verification system of FIG. 1B, in accordance with an exemplary embodiment of the disclosure.

FIG. 3 is a flow chart illustrating exemplary operations for automatic content recognition and verification in a broadcast chain by the graphics verification system of FIG. 1B, in accordance with an exemplary embodiment of the disclosure. Referring to FIG. 3, there is shown a flow chart 300 comprising exemplary operations 302 through 318.

At 302, content may be received from the source device 106 over a communication network, such as the network 110. The content may be ingested to the graphics server 114 using the ingest engine 122. The received content may be uncompressed raw content, such as a SDI video. The received content may comprise one or more programs, commercials and promotional media (promos). Typically, the received content may correspond to a clean version of content in a certain media format. For example, the received content may be in a material exchange format (MXF) operational pattern 1a (OP1a) or other format that supports high quality video (such as SDI video). The received content may correspond to a full raster. The clean version of actual content refers to actual content devoid of any graphics, such as overlaid channel logo, lower third graphics, closed captions, and the like. Alternatively, in certain scenarios, in addition to the actual clean version of content, the received content may also comprise certain graphics, along with the one or more programs, commercials, and/or promotional media (promos).

At 304, fingerprints of the content in the full raster may be generated. The ingest engine 122 may be configured to generate raster fingerprints, which correspond to the fingerprints of the actual content in the full raster. The raster fingerprints may be generated based on one or more content characteristics, for example, one or more visual features, of the content. The ingest engine 122 may communicate the generated raster fingerprints to be stored in the content fingerprint database 128. Alternatively, in certain scenarios, the received content may include pre-embedded watermarks/fingerprints. In such cases, the ingest engine 122 at the graphics server 114 may be configured to detect the watermarks/fingerprints by use of the ACR-module in the ingest engine 122, and communicate the detected raster fingerprints/watermarks to the content fingerprint database 128. In accordance with an embodiment, a plurality of graphics may also be ingested to the graphics server 114 (or another server dedicated for graphics) by use of the graphics engine 124. Alternatively, such plurality of graphics may be pre-stored in the content database 126 or other storage units communicatively coupled to the content database 126 or the graphics server 114. In accordance with an embodiment, a graphics operator may create graphics on the user terminal 146, and ingest into the graphics server 114 or the other servers dedicated for graphics storage, which may then be further communicated and stored in the content database 126.

At 306, the fingerprints of each of the plurality of graphics may be generated. The graphics engine 124 may be configured to generate graphics fingerprints, which correspond to the fingerprints of the plurality of graphics that is to be overlaid on the on-screen view of the channel in the broadcast chain system 118. The graphics fingerprints may be generated based on one or more graphics characteristics, for example, one or more visual features, associated with the plurality of graphics. The coordinates, for example, x-coordinate and y-coordinate, that indicates position of the graphics on the on-screen view, graphic type, such as a channel logo, or a symbol, and the generated fingerprints of a particular graphics item, may be communicated to the graphics fingerprint database 130 by the graphics engine 124. The graphics fingerprint database 130 may be configured to store the received information of X,Y-coordinates of the graphic item, such as a channel logo, on the full raster, graphic type, and the generated graphics fingerprints in association with each other in the graphics fingerprint database 130.

At 308, the received content may be communicated to the broadcast chain system 118. The ingest engine 122 may be configured to communicate the received content to the broadcast chain system 118. In an embodiment, the ingest engine 122 may store the received content in the content database 126. Thereafter, the stored content may be retrieved by the playout server 132 based on the programming schedule received from the broadcast automation system 108. The playout server 132 may be configured to receive content from the content database 126 in the uncompressed SDI video format. The playout server 132 may further generate a series of on-screen views, for example, a linear stream of the content in an uncompressed SDI format. The series of on-screen views may be generated based on the programming schedule provided by the broadcast automation system 108. The programming schedule may indicate a time-based parameter and/or a region-based parameter. For example, the programming schedule may indicate a start time, an end time of content in the series of on-screen views. The time-based parameter of the programming schedule may be indicative of timecodes or timing identifiers at which the content and/or graphics are required to be overlaid on the on-screen view of the channel during multicasting of the channel. The region-based parameter of the programming schedule may be indicative of specific regions or sections on the on-screen view of the channel where the content and/or graphics are required to be overlaid. The playout server 132 may further communicate the on-screen view to the graphics server 134, the CC server 136, and the Nielsen system 138 for insertion of various, closed captions, and Nielsen watermarks on the on-screen views, in accordance with the programming schedule provided by the broadcast automation system 108. Thus, in the broadcast chain system 118, a plurality of graphics, closed captions, and/or Nielsen watermarks, may be overlaid (or inserted) in the received content that is in uncompressed SDI format. The graphics verification system 102 may employ a plurality of IMDs, such as the first IMD 144A and the second IMD 114B, for the content and graphics monitoring at one or more locations in a broadcast chain. The plurality of IMDs, such as the first IMD 144A and the second IMD 114B, may be placed at a plurality of locations in the broadcast chain system 118, for example, between the Nielsen system 138 and the OATC/SCTE system 140 and the OATC/SCTE system 140 and the encoder server 142, as shown in FIG. 1B. It should be understood that the plurality of IMDs may be placed at other locations, for example, after the encoder server 142 or after the graphics server 134, for content and graphics monitoring, without limiting the scope of the disclosure.

At 310, an on-screen view of a channel may be partitioned into a plurality of sections. The verification server 120 may be configured to partition the on-screen view of the channel based on an overlay of a plurality of graphics on the on-screen view of the channel in the broadcast chain system 118. The plurality of graphics may comprise, for example, a channel logo, a sign, a symbol, lower one-third graphics, a rating key, and/or a ticker. The on-screen of the channel may further comprise content associated with the plurality of graphics. An example of the partitioning of the on-screen view of a channel into a plurality of sections, such as the sections 202 to 218, has been shown, and described in FIG. 2.

At 312, a placement of each of the overlaid plurality of graphics in the plurality of sections with respect to the associated content, may be determined. The verification server 120 may be configured to determine the placement of each of the overlaid plurality of graphics in the plurality of sections with respect to the associated content on the on-screen view of the channel. The placement of each of the plurality of graphics in the plurality of sections may be determined based on a concurrent look-up of each of the plurality of graphics in the plurality of sections and the associated content overlaid on the on-screen view of the channel. The concurrent look-up may be executed by the verification server 120, based on a graphics ID of each of the plurality of graphics in the plurality of sections and a content ID of the associated content of each of the plurality of graphics. The graphics ID may be associated with the fingerprints of each of the plurality of graphics. The content ID may be associated with the fingerprints of the associated content of each of the plurality of graphics. The plurality of IMDs, such as the first IMD 144A and the second IMD 144B, may be configured to execute code to continually or intermittently read and detect the inserted/embedded fingerprints (and/or watermarks), and communicate the information to the verification server 120. As the ACR database 116 stores information and associations among the fingerprints and corresponding IDs, (such as a graphic ID and a corresponding graphic fingerprint in the graphics fingerprint database 130 or a content ID and a corresponding raster fingerprint in the content fingerprint database 128), the verification server 120 may be configured to verify each of the plurality of graphics and the associated content in the various sections of the on-screen view, by use of the first IMD 144A.

Firstly, the verification server 120 may be configured to compare the detected fingerprints of the overlaid plurality of graphics on the on-screen view of the channel with the graphics fingerprints stored in the graphics fingerprint database 130. Thereafter, the verification server 120 may extract graphic IDs of those graphics fingerprints from the graphics fingerprint database 130 that matches with detected fingerprints of overlaid plurality of graphics on the on-screen view of the channel. The extracted graphic IDs represents graphic IDs of the overlaid plurality of graphics on the on-screen view of the channel. Each of the on-screen view of the channel may be the full raster view, which may be associated with a unique timing identifiers, such as a time code (timecode). An example of the time code may be Vertical Interval Timecode (VITC). Similarly, the verification server 120 may also be configured to compare the detected fingerprints of the associated content (actual content) on which the plurality of graphics are overlaid on the on-screen view of the channel with the raster fingerprints stored in the content fingerprint database 128. Thereafter, the verification server 120 may extract content ID from the content fingerprint database 128 that matches with detected fingerprints of the associated content on the on-screen view of the channel. The extracted content ID represents the content ID of the associated content (actual content) on the on-screen view of the channel. Once the graphic IDs of the overlaid plurality of graphics and the content ID of the associated content for the on-screen view of the channel are extracted and available, the verification server 120 may be configured to verify whether the graphic IDs of the overlaid plurality of graphics matches with the graphic IDs specified in the programming schedule for a particular timing identifier, such as the unique time code associated with the full raster (i.e. the on-screen view of the channel). Further, the verification server 120 may be configured to verify whether the content ID of the associated content for the on-screen view of the channel matches with the content ID specified in the programming schedule for the particular timecodes, such as the unique time code associated with the full raster (i.e. the on-screen view of the channel). Thus, the time-based parameter of the programming schedule that is indicative of timecodes at which the content and/or graphics are required to be overlaid on the on-screen view of the channel during multicasting of the channel, is utilized. Further, as X,Y-coordinates and graphic type information is also associated with each of the graphics IDs in the graphics fingerprint database 130, thus the verification server 120 may also verify such information with the metadata in the programming schedule for the matched graphics ID for the particular time code, such as the unique time code associated with the full raster. This is how the region-based parameter of the programming schedule that is indicative of specific regions or sections on the on-screen view of the channel where the content and/or graphics are required to be overlaid, is utilized. Thus, the placement of each of the overlaid plurality of graphics in the plurality of sections with respect to associated content on the on-screen view of the channel, is determined.

At 314, one or more error parameters may be detected on the on-screen view. The one or more error parameters may be detected to identify a correct placement of each of the plurality of graphics intended for a specific content on the on-screen view of the channel. The verification server 120 may be configured to detect the one or more error parameters on the on-screen view based on the determined placement of each of the overlaid plurality of graphics in the plurality of sections with respect to the associated content. For example, the one or more error parameters may be detected based on a mismatch in the fingerprints of the overlaid plurality of graphics and the associated content with respect to the graphics fingerprints and the raster fingerprints, respectively. The mismatch may be determined based on the concurrent look-up of the overlaid plurality of graphics and the associated content using the fingerprints of the overlaid plurality of graphics and the associated content. The one or more error parameters may also correspond to errors related to positions of the plurality of graphics in the plurality of sections on the on-screen view. The verification server 120 may further utilize the time-based parameter and/or the region-based parameter of the programming schedule that corresponds to the plurality of graphics and the content in the full raster, to execute the concurrent look-up.

At 316, the on-screen view of the channel may be calibrated based on the detected one or more error parameters. The verification server 120 may be configured to calibrate the on-screen view of the channel, prior to multi-casting of the channel. For example, the on-screen view of the channel may be calibrated based on the detected one or more error parameters of the overlaid plurality of graphics. The overlaid plurality of graphics on the on-screen view of the channel may be automatically calibrated based on the detected one or more error parameters. For example, the verification server 120 may replace the incorrect placement of an overlaid graphics of the overlaid plurality of graphics with a correct graphics retrieved from the content database 126 or other server dedicated for graphics storage as specified in the programming schedule provided by the broadcast automation system 108. Similarly, the on-screen view of the channel may be calibrated based on the detected one or more error parameters related to the associated content on which the plurality of graphics are overlaid. For example, the verification server 120 may replace the incorrect content item currently associated with the overlaid plurality of graphics with a correct content item retrieved from the content database 126. The correct content item refers to a content item that is expected to be played at a specific time instant with respect to the overlaid plurality of graphics on the on-screen view as specified in the programming schedule.

At 318, the on-screen view of the channel may be re-calibrated at a plurality of locations in the broadcast chain. For example, another IMD, such as the second IMD 144B, may be placed between the OATC/SCTE system 140 and the encoder server 142, as shown in FIG. 1B. The verification server 120 may be configured to utilize a plurality of IMDs, to re-calibrate the on-screen view of the channel. The re-calibration of the on-screen view of the channel further ensures a fail-safe and accurate placement of each of the plurality of graphics and the associated content in the plurality of sections of the on-screen view of the channel.

Figure 4A:
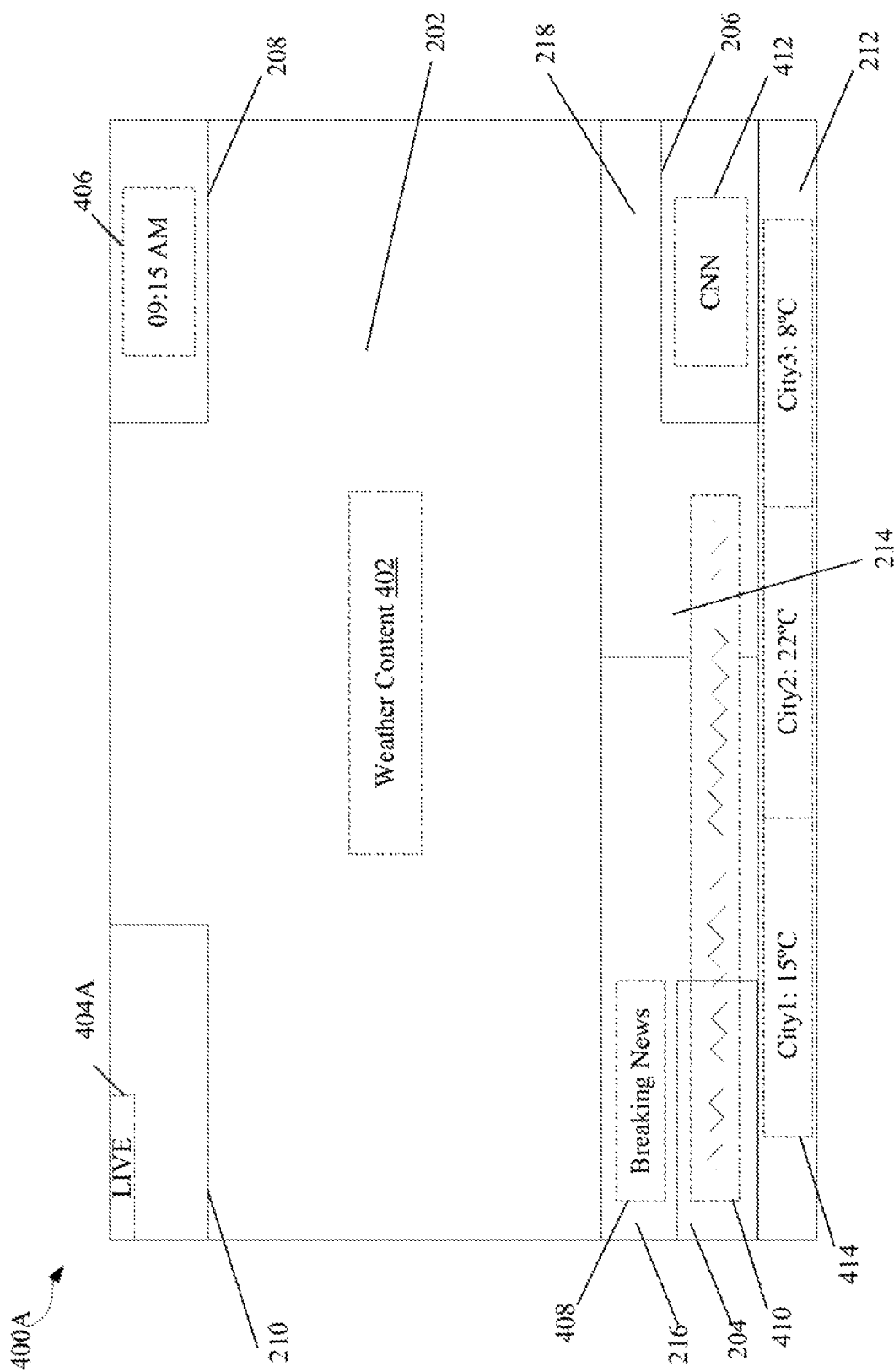
FIGS. 4A and 4B are block diagrams that illustrate an exemplary scenario for automatic content recognition and verification in a broadcast chain by the graphics verification system of FIG. 1B, in accordance with an exemplary embodiment of the disclosure.
Figure 4B:
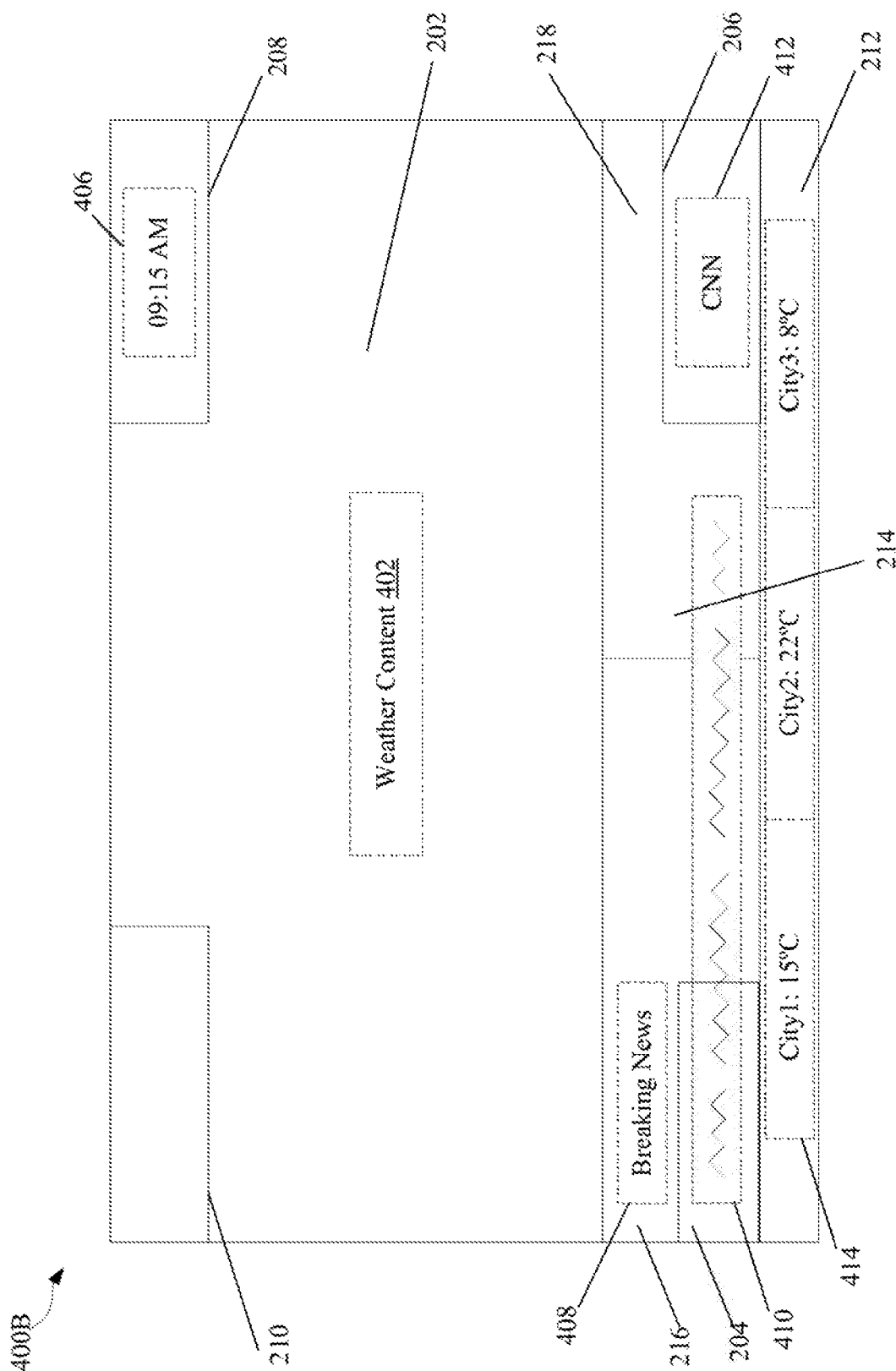

FIGS. 4A and 4B are block diagrams that illustrate an exemplary scenario for automatic content recognition and verification in a broadcast chain by the graphics verification system of FIG. 1B, in accordance with an exemplary embodiment of the disclosure. Referring to FIG. 4A, there is shown an exemplary scenario 400A that displays an on-screen view of a channel "CXX". There is shown a plurality of graphics 404 to 414 overlaid on weather content 402 in plurality of sections 202 to 218 in the on-screen view of the channel "CXX". In accordance with the exemplary scenario 400A, the plurality of graphics 404 to 414 includes a LIVE symbol 404, a text placeholder 406, a dynamic logo 408, a closed captioning placeholder 410, a channel logo 412, and a ticker 414. The plurality of sections 202 to 218 has been described in FIG. 2.

In accordance with the exemplary scenario 400A, one or more IMDs, such as the first IMD 144A (as shown in FIG. 1B), may be configured to detect the embedded fingerprints (and/or watermarks) in the plurality of sections of the 202 to 218, and communicate the information to the verification server 120. Each of the on-screen view of the channel "CXX". may be the full raster view, which may be associated with a unique time code. The verification server 120 may be configured to execute a concurrent look-up for each of the plurality of graphics 404 to 414 in the plurality of sections 204 to 218 and the associated content, such as the weather content 402, in the first section 202, on the on-screen view of the channel "CXX". For example, the verification server 120 may be configured to compare the detected fingerprints of the LIVE symbol 404 in the fifth section 210, the text placeholder 406 (which includes time for example, "09:15 AM"), in the fourth section 208, and the lower one-third graphics in the seventh section 214 with the graphics fingerprints stored in the graphics fingerprint database 130. With regards to the lower one-third graphics, the verification server 120 may be further configured to compare the detected fingerprints of the dynamic logo 408, such as "Breaking News" logo, the closed captioning placeholder 410, and the channel logo 412, such as "CXX" channel logo", and the ticker 414 with the graphics fingerprints stored in the graphics fingerprint database 130. Similarly, the verification server 120 may also be configured to compare the detected fingerprint of the associated content, such as the weather content 402, on which the plurality of graphics 404 to 414 are overlaid on the on-screen view of the channel "CXX" with the raster fingerprints stored in the content fingerprint database 128. Thereafter, the verification server 120 may be configured to extract graphic IDs of those graphics fingerprints from the graphics fingerprint database 130 that matches with detected fingerprints of overlaid plurality of graphics 404 to 414 on the on-screen view of the channel "CXX". Thereafter, the verification server 120 may extract content ID of the weather content 402 based on match of the detected fingerprint of the weather content 402 in the content fingerprint database 128.

The verification server 120 may be configured to verify whether the graphic IDs of the overlaid plurality of graphics 404 to 414 matches with the graphic IDs specified in the programming schedule for the on-screen view of the channel "CXX" at the unique time code associated with the full raster (i.e. the current on-screen view). The verification server 120 may be configured to verify whether the content ID of the weather content 402 on-screen view of the channel "CXX" matches with the content ID specified in the programming schedule for the particular timing identifier, such as the unique time code associated with the full raster (i.e. the current on-screen view of the channel "CXX"). Thus, the verification server 120 may be configured to determine that all the plurality of graphics 406 to 414 (except the LIVE symbol 404 in the fifth section 210) are accurately placed in the plurality of sections 202 to 218 with respect to associated content, such as the weather content 402, on the on-screen view of the channel "CXX". The verification server 120 may be configured to detect an error parameter of incorrect placement of the LIVE symbol 404 on the on-screen view of the channel "CXX". The graphic ID of the LIVE symbol 404 may not be found in the programming schedule for the unique time code, associated with the full raster (i.e. the current on-screen view of the channel "CXX") for the weather content 402. In other words, it may be ascertained that the LIVE symbol 404 was not meant for the weather content 402 and was supposed to be overlaid on subsequent content item, for example, a live coverage of an event, and should have been appeared after certain number of video frames (such as after 3 frames) as specified in the programming schedule. In accordance with an embodiment, the verification server 120 may be configured to calibrate the on-screen view of the channel "CXX". For example, the LIVE symbol 404, may be removed from the channel "CXX."

Referring to FIG. 4B, there is shown an exemplary scenario 400B that displays a calibrated on-screen view of the channel "CXX". With respect to the exemplary scenario 400B, it is shown the calibrated on-screen view of the channel "CXX" of FIG. 4A, where the previously overlaid graphic of the LIVE symbol 404 is removed from the weather content 402 on the calibrated on-screen view of the channel "CXX". The verification server 120 may be configured to calibrate the on-screen view of the channel "CXX," prior to encoding and multicasting of the channel "CXX" so that the channel "CXX" is error-free when finally aired to be viewed on the user-computing devices 112a, ..., 112n.

Figure 5:
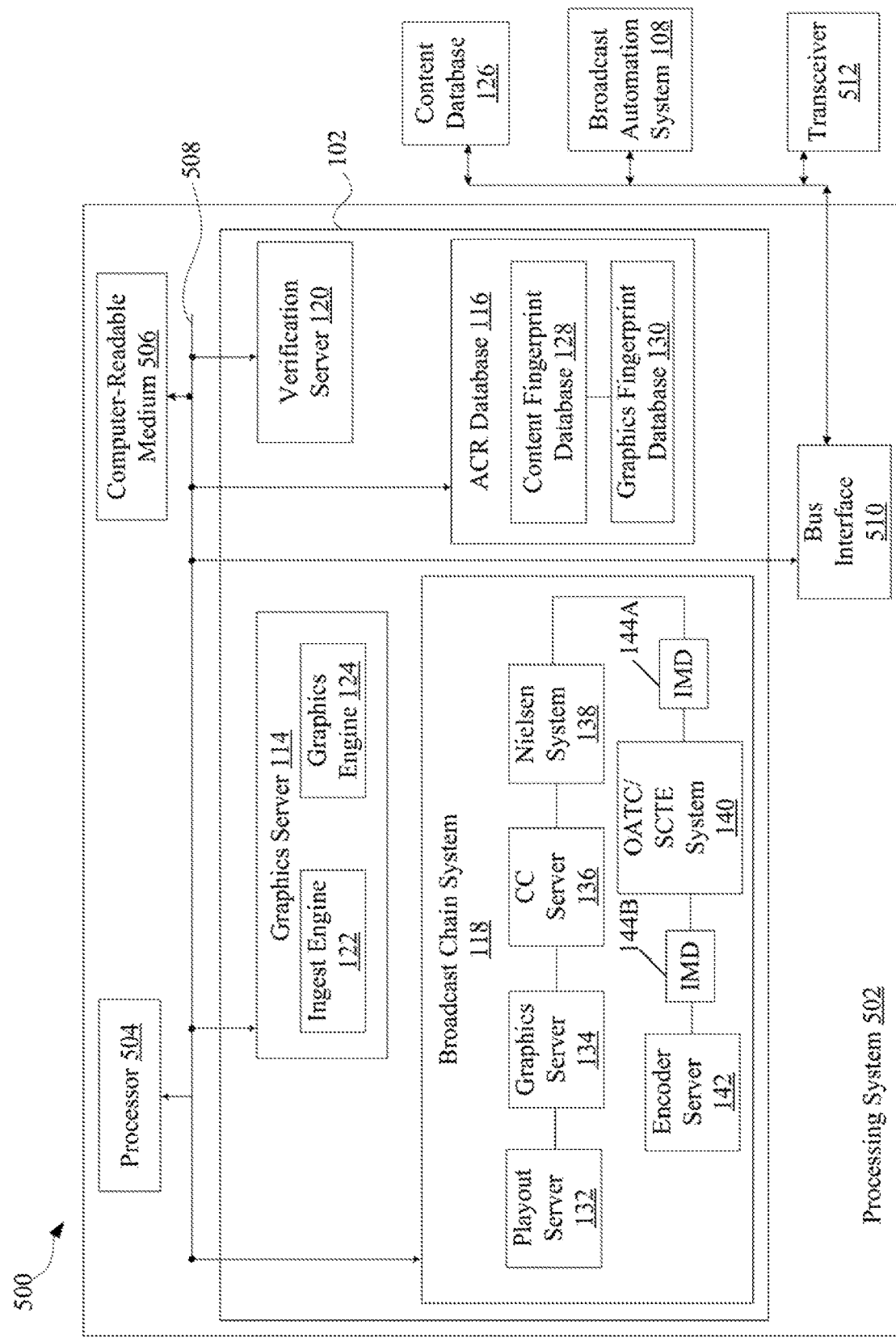
FIG. 5 is a conceptual diagram illustrating an example of a hardware implementation for a graphics verification system employing a processing system for automatic content recognition and verification in a broadcast chain, in accordance with an exemplary embodiment of the disclosure.

FIG. 5 is a conceptual diagram illustrating an example of a hardware implementation for a graphics verification system employing a processing system for automatic content recognition and verification in a broadcast chain, in accordance with an exemplary embodiment of the disclosure. Referring to FIG. 5, the hardware implementation shown by a representation 500 for the graphics verification system 102 employs a processing system 502 for automatic content recognition and verification in a broadcast chain, in accordance with an exemplary embodiment of the disclosure, as described herein. In some examples, the processing system 502 may comprise one or more hardware processors, such as the processor 504, a non-transitory computer-readable medium 506, a hardware graphics server 114, a hardware ACR database 116, a hardware broadcast chain system 118, and a hardware verification server 120. The hardware graphics server 114 may include the ingest engine 122 and the graphics engine 124. The hardware ACR database 116 may comprise a hardware content fingerprint database 128 and a hardware graphics fingerprint database 130. The hardware broadcast chain system 118 may comprise a hardware playout server 132, a hardware graphics server 134, a hardware CC server 136, a hardware Nielsen system 138, a hardware OATC/SCTE system 140, and a hardware encoder server 142. A hardware first IMD 144A and a hardware second IMD 144B may also be placed inline in the broadcast chain, such as in the hardware broadcast chain system 118, as shown.

In this example, the graphics verification system 102 employing the processing system 502 may be implemented with bus architecture, represented generally by bus 508. The bus 508 may include any number of interconnecting buses and bridges depending on the specific implementation of the graphics verification system 102 and the overall design constraints. The bus 508 links together various circuits including the one or more processors, represented generally by the processor 504, the non-transitory computer-readable media, represented generally by the computer-readable medium 506, the hardware graphics server 114, the hardware ACR database 116, the hardware broadcast chain system 118, and the hardware verification server 120 which may be configured to perform one or more operations or methods described herein. A bus interface 510 provides an interface between the bus 508 and a transceiver 512. The transceiver 512 provides a means for communicating via the network 110 with various other apparatus, such as the published data sources 104a, ..., 104n, the source device 106, the hardware content database 126, the broadcast automation system 108, and the user-computing devices 112a, ..., 112n.

The processor 504 may be configured to manage the bus 508 and general processing, including the execution of a set of instructions stored on the computer-readable medium 506. The set of instructions, when executed by the processor 504, causes the graphics verification system 102 to execute the various functions described herein for any particular apparatus. The computer-readable medium 506 may also be used for storing data that is manipulated by the processor 504 when executing the set of instructions. The computer-readable medium 506 may also be configured to store data for one or more of the ingest engine 122, the graphics engine 124, the hardware ACR database 116, the content database 126, the hardware broadcast chain system 118, and the hardware verification server 120.

In an aspect of the disclosure, the processor 504, the computer-readable medium 506, or a combination of both may be configured or otherwise specially programmed to execute the operations or functionality of the hardware ACR database 116, the hardware broadcast chain system 118, and the hardware verification server 120, or various other components described herein. For example, the processor 504, the computer-readable medium 506, or a combination of both may be configured or otherwise specially programmed to perform the operations and functionality of the hardware first IMD 144A, the hardware second IMD 144B, the hardware ACR database 116, and the hardware verification server 120, as described with respect to FIGS. 1A, 1B, 2, 3, 4A, and 4B.

Various embodiments of the disclosure comprise a graphics verification system 102 that may be configured to handle automatic content recognition and verification in a broadcast chain. The graphics verification system 102 may comprise, for example, the ingest engine 122, the graphics engine 124, the ACR database 116, the verification server 120, and a plurality of IMDs, such as the first IMD 144A and the second IMD 144B. The ACR database 116 may comprise the content fingerprint database 128 and the graphics fingerprint database 130. The broadcast chain system 118 may comprise the playout server 132, the graphics server 134, the CC server 136, the Nielsen system 138, the OATC/SCTE system 140, and the encoder server 142. The plurality of IMDs, such as the first IMD 144A and the second IMD 144B, may be placed in the broadcast chain system 118 for content monitoring. The verification server 120 may be configured to partition an on-screen view of the channel into a plurality of sections based on an overlay of a plurality of graphics on the on-screen view of the channel. The verification server 120 may be configured to determine a placement of each of a plurality of graphics overlaid in a plurality of sections of an on-screen view of a channel. The placement of each of the plurality of graphics in the plurality of sections may be determined with respect to the associated content of the plurality of graphics, based on a concurrent look-up of each of the plurality of graphics in the plurality of sections and the associated content overlaid on the on-screen view of the channel. The concurrent look-up may be executed based on fingerprints of each of the plurality of graphics in the plurality of sections and the associated content overlaid on the on-screen view of the channel. Based on the determined placement of each of the overlaid plurality of graphics in the plurality of sections with respect to the associated content, one or more error parameters are detected on the on-screen view of the channel. The verification server 120 may further calibrate the on-screen view of the channel based on the detected one or more error parameters, prior to multicasting of the channel. For example, any inaccuracy detected in the placement of the plurality of graphics and the associated content on the on-screen view of the channel causes the verification server 120 to replace the incorrect placement with the correct placement of the plurality of graphics and the associated content.

The verification server 120 in association with the plurality of IMDs, such as the first IMD 144A and the second IMD 144B, provides significant productivity and efficiency improvements since the process of monitoring a plurality of sections at the same time on the on-screen views has been simplified and a real time or near-real time in a broadcast chain. Further, the verification server 120 and the plurality of IMDs provides an ability to the graphics verification system 102 to automatically detect any inaccuracy in the placement of the plurality of graphics and the associated content of hundreds of channels in the broadcast chain prior to encoding and multicasting of the channels. Furthermore, based on the detected inaccuracy in the placement of the plurality of graphics and the associated content, the verification server 120 may automatically correct the inaccurate placement. Thus, the broadcast chain in which the content is automatically monitored, verified, and corrected in case of inaccurate placement, may not be required to pass manual observations that may be time consuming and costly, when hundreds of channels are required to monitored at the same time. Furthermore, such automation may result in much faster processing time (faster computation time without sacrificing accuracy), and avoid human errors.

Various embodiments of the disclosure may provide a non-transitory computer-readable medium having stored thereon, computer implemented instruction that when executed by a processor causes the graphics verification system 102 to execute operations to handle content of a channel in a broadcast chain. The content may comprise video, audio and/or ancillary data that is associated with any portion of a particular content. The graphics verification system 102 may execute operations comprising partitioning an on-screen view of the channel into a plurality of sections based on an overlay of a plurality of graphics on the on-screen view of the channel. A placement of each of the overlaid plurality of graphics in the plurality of sections is determined with respect to associated content on the on-screen view of the channel. The placement of each of the plurality of graphics in the plurality of sections with respect to the associated content is determined based on a concurrent look-up of each of the plurality of graphics in the plurality of sections and the associated content. One or more error parameters are detected on the on-screen view of the channel based on the determined placement of each of the overlaid plurality of graphics in the plurality of sections with respect to the associated content. The on-screen view of the channel is calibrated prior to multicasting of the channel, based on the detected one or more error parameters.

As utilized herein the terms "circuits" and "circuitry" refer to physical electronic components (i.e. hardware) and any software and/or firmware ("code") which may configure the hardware, be executed by the hardware, and/or otherwise be associated with the hardware. As used herein, for example, a particular processor and memory may comprise a first "circuit" when executing a first one or more lines of code and may comprise a second "circuit" when executing a second one or more lines of code. As utilized herein, "and/or" means any one or more of the items in the list joined by "and/or". As an example, "x and/or y" means any element of the three-element set $\{(x), (y), (x, y)\}$. As another example, "x, y, and/or z" means any element of the seven-element set $\{(x), (y), (z), (x, y), (x, z), (y, z), (x, y, z)\}$. As utilized herein, the term "exemplary" means serving as a non-limiting example, instance, or illustration. As utilized herein, the terms "e.g.," and "for example" set off lists of one or more non-limiting examples, instances, or illustrations. As utilized herein, circuitry is "operable" to perform a function whenever the circuitry comprises the necessary hardware and code (if any is necessary) to perform the function, regardless of whether performance of the function is disabled, or not enabled, by some user-configurable setting.

The terminology used herein is for the purpose of describing particular embodiments only and is not intended to be limiting of embodiments of the disclosure. As used herein, the singular forms "a", "an" and "the" are intended to include the plural forms as well, unless the context clearly indicates otherwise. It will be further understood that the terms "comprises", "comprising,", "includes" and/or "including", when used herein, specify the presence of stated features, integers, steps, operations, elements, and/or components, but do not preclude the presence or addition of one or more other features, integers, steps, operations, elements, components, and/or groups thereof.

Further, many embodiments are described in terms of sequences of actions to be performed by, for example, elements of a computing device. It will be recognized that various actions described herein can be performed by specific circuits (e.g., application specific integrated circuits (ASICs)), by program instructions being executed by one or more processors, or by a combination of both. Additionally, these sequence of actions described herein can be considered to be embodied entirely within any non-transitory form of computer readable storage medium having stored therein a corresponding set of computer instructions that upon execution would cause an associated processor to perform the functionality described herein. Thus, the various aspects of the disclosure may be embodied in a number of different forms, all of which have been contemplated to be within the scope of the claimed subject matter. In addition, for each of the embodiments described herein, the corresponding form of any such embodiments may be described herein as, for example, "logic configured to" perform the described action.

Another embodiment of the disclosure may provide a non-transitory machine and/or computer readable storage and/or media, having stored thereon, a machine code and/or a computer program having at least one code section executable by a machine and/or a computer, thereby causing the machine and/or computer to perform the steps as described herein to handle automatic content recognition and verification in a broadcast chain.

The present disclosure may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

Further, those of skill in the art will appreciate that the various illustrative logical blocks, modules, circuits, algorithm, and/or steps described in connection with the embodiments disclosed herein may be implemented as electronic hardware, computer software, firmware, or combinations thereof. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The methods, sequences and/or algorithms described in connection with the embodiments disclosed herein may be embodied directly in firmware, hardware, in a software module executed by a processor, or in a combination thereof. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor.

While the present disclosure has been described with reference to certain embodiments, it will be noted understood by, for example, those skilled in the art that various changes and modification could be made and equivalents may be substituted without departing from the scope of the present disclosure as defined, for example, in the appended claims. In addition, many modifications may be made to adapt a particular situation or material to the teachings of the present disclosure without departing from its scope. The functions, steps and/or actions of the method claims in accordance with the embodiments of the disclosure described herein need not be performed in any particular order. Furthermore, although elements of the disclosure may be described or claimed in the singular, the plural is contemplated unless limitation to the singular is explicitly stated. Therefore, it is intended that the present disclosure not be limited to the particular embodiment disclosed, but that the present disclosure will include all embodiments falling within the scope of the appended claims.

What is claimed is:

1. A system, comprising:
one or more processors in a graphics verification system that manages content of a channel in a broadcast chain, the one or more processors configured to:
partition an on-screen view of the channel into a plurality of sections based on an overlay of a plurality of graphics on the on-screen view of the channel;
determine a placement of each of the overlaid plurality of graphics in the plurality of sections with respect to associated content on the on-screen view of the channel,
wherein the placement of each of the overlaid plurality of graphics in the plurality of sections is determined based on a time-based parameter of a programming schedule and a region-based parameter of the programming schedule,
wherein the programming schedule corresponds to the plurality of graphics and the associated content on the on-screen view;
detect one or more error parameters based on the determined placement of each of the overlaid plurality of graphics in the plurality of sections with respect to the associated content,
wherein the one or more error parameters correspond to errors related to positions of the overlaid plurality of graphics on the on-screen view;
remove a first overlaid graphic of the overlaid plurality of graphics on the on-screen view of the channel based on a first graphics identifier (ID) of the first overlaid graphic that is in the programming schedule at a time code for a subsequent content item; and
reinstate the first overlaid graphic on the on-screen view of the channel after a number of video frames based on the detected one or more error parameters,
wherein the number of video frames is associated with the time code for the subsequent content item.

2. The system according to claim 1, wherein the plurality of graphics comprises at least one of a channel logo, a sign, a symbol, a text placeholder, full screen graphics, partial screen graphics, text crawl, a rating key, or a ticker.

3. The system according to claim 1, wherein the placement of each of the plurality of graphics in the plurality of sections with respect to the associated content is determined based on a concurrent look-up of each of the plurality of graphics in the plurality of sections and the associated content to identify correct placement of the plurality of graphics intended for specific content on the on-screen view of the channel.

4. The system according to claim 3, wherein the one or more processors are further configured to execute the concurrent look-up based on a graphics ID of each of the plurality of graphics in the plurality of sections and a content ID of the associated content of each of the plurality of graphics, and
wherein the graphics ID corresponds to fingerprints of each of the plurality of graphics, and wherein the content ID corresponds to fingerprints of the associated content.

5. The system according to claim 4, wherein the one or more processors are further configured to generate, by a graphics engine, graphics fingerprints, which correspond to the fingerprints of the plurality of graphics,
wherein the graphics fingerprints are generated based on at least one or more visual features in the plurality of graphics,
wherein the graphics fingerprints are generated for a plurality of coordinates that indicate the positions of the overlaid plurality of graphics on the on-screen view, and wherein the generated graphics fingerprints are stored in a graphics fingerprint database.

6. The system according to claim 5, wherein the one or more processors are further configured to compare the fingerprints of the overlaid plurality of graphics detected on the on-screen view of the channel with the graphics fingerprints stored in the graphics fingerprint database, and
wherein the comparison is executed to detect the one or more error parameters of the overlaid plurality of graphics.

7. The system according to claim 6, wherein the overlaid plurality of graphics on the on-screen view of the channel is automatically corrected in the broadcast chain based on the detected one or more error parameters.

8. The system according to claim 1, wherein the one or more processors are further configured to generate, by an ingest engine, raster fingerprints for the associated content,
wherein the raster fingerprints for the associated content are generated based on one or more visual features of the associated content, and
wherein the generated raster fingerprints are stored in a content fingerprint database.

9. The system according to claim 8, wherein the one or more processors are further configured to compare fingerprints of the associated content on which the plurality of graphics are overlaid on the on-screen view of the channel with the raster fingerprints stored in the content fingerprint database, and
wherein the comparison is executed to detect the one or more error parameters related to the associated content.

10. The system according to claim 9, wherein the associated content that corresponds to a specific content item associated with the overlaid plurality of graphics for a specific time instant on the on-screen view of the channel is automatically corrected based on the detected one or more error parameters.

11. The system according to claim 10, wherein the one or more processors are further configured to verify each of the plurality of graphics in the plurality of sections and the associated content based on the time-based parameter of the programming schedule and the region-based parameter of the programming schedule, and
wherein the programming schedule is determined by a broadcast automation system.

12. The system according to claim 11, wherein the time-based parameter of the programming schedule is indicative of a timing identifier at which the plurality of graphics and the associated content are required to be overlaid on the on-screen view of the channel during multicasting of the channel.

13. The system according to claim 11, wherein the region-based parameter of the programming schedule is indicative of specific regions on the on-screen view of the channel where the plurality of graphics and the associated content are required to be overlaid on the on-screen view of the channel during multicasting of the channel, and
wherein the specific regions on the on-screen view of the channel correspond to the plurality of sections.

14. The system according to claim 10, wherein the one or more processors are further configured to utilize a plurality of automatic content recognition (ACR)-based inline-monitoring devices (IMDs) placed at a plurality of locations in the broadcast chain, to concurrently detect fingerprints of each of the plurality of graphics in the plurality of sections and the fingerprints of the associated content on which the plurality of graphics are overlaid.

15. A method, comprising:
in a graphics verification system that manages content of a channel in a broadcast chain:
partitioning an on-screen view of the channel into a plurality of sections based on an overlay of a plurality of graphics on the on-screen view of the channel;
determining a placement of each of the overlaid plurality of graphics in the plurality of sections with respect to associated content on the on-screen view of the channel,
wherein the placement of each of the overlaid plurality of graphics in the plurality of sections is determined based on a time-based parameter of a programming schedule and a region-based parameter of the programming schedule,
wherein the programming schedule corresponds to the plurality of graphics and the associated content on the on-screen view;
detecting one or more error parameters based on the determined placement of each of the overlaid plurality of graphics in the plurality of sections with respect to the associated content, wherein the one or more error parameters correspond to errors related to positions of the overlaid plurality of graphics on the on-screen view;
removing a first overlaid graphic of the overlaid plurality of graphics on the on-screen view of the channel based on a first graphics identifier (ID) of the first overlaid graphic that is in the programming schedule at a time code for a subsequent content item; and
reinstating the first overlaid graphic on the on-screen view of the channel after a number of video frames based on the detected one or more error parameters,
wherein the number of video frames is associated with the time code for the subsequent content item.

16. The method according to claim 15, wherein the plurality of graphics comprises at least one of a channel logo, a sign, a symbol, a text placeholder, full screen graphics, partial screen graphics, text crawl, a rating key, or a ticker.

17. The method according to claim 15, wherein the placement of each of the plurality of graphics in the plurality of sections with respect to the associated content is determined based on a concurrent look-up of each of the plurality of graphics in the plurality of sections and the associated content to identify correct placement of the plurality of graphics intended for specific content on the on-screen view of the channel.

18. The method according to claim 17, further comprising executing the concurrent look-up based on a graphics ID of each of the plurality of graphics in the plurality of sections and a content ID of the associated content of each of the plurality of graphics, and
wherein the graphics ID corresponds to fingerprints of each of the plurality of graphics, and wherein the content ID corresponds to fingerprints of the associated content.

19. The method according to claim 18, further comprising generating, by a graphics engine, graphics fingerprints, which correspond to the fingerprints of the plurality of graphics,
wherein the graphics fingerprints are generated based on one or more visual features in the plurality of graphics, wherein the graphics fingerprints are generated for a plurality of coordinates that indicate the positions of the overlaid plurality of graphics on the on-screen view, and wherein the generated graphics fingerprints are stored in a graphics fingerprint database.

20. The method according to claim 19, further comprising comparing the fingerprints of the overlaid plurality of graphics detected on the on-screen view of the channel with the graphics fingerprints stored in the graphics fingerprint database, and wherein the comparison is executed to detect the one or more error parameters of the overlaid plurality of graphics.

21. The method according to claim 20, wherein the overlaid plurality of graphics on the on-screen view of the channel is automatically corrected in the broadcast chain based on the detected one or more error parameters.

22. The method according to claim 15, further comprising generating, by an ingest engine, raster fingerprints for the associated content, wherein the raster fingerprints for the associated content are generated based on one or more visual features of the associated content, and wherein the generated raster fingerprints are stored in a content fingerprint database.

23. The method according to claim 22, further comprising comparing fingerprints of the associated content on which the plurality of graphics are overlaid on the on-screen view of the channel with the raster fingerprints stored in the content fingerprint database, and wherein the comparison is executed to detect the one or more error parameters related to the associated content.

24. The method according to claim 23, wherein the associated content that corresponds to a specific content item associated with the overlaid plurality of graphics for a specific time instant on the on-screen view of the channel is automatically corrected based on the detected one or more error parameters.

25. The method according to claim 24, further comprising verifying each of the plurality of graphics in the plurality of sections and the associated content on the on-screen view based on the time-based parameter and the region-based parameter of the programming schedule, and wherein the programming schedule is determined by a broadcast automation system.

26. The method according to claim 25, wherein the time-based parameter of the programming schedule is indicative of a timing identifier at which the plurality of graphics and the associated content are required to be overlaid on the on-screen view of the channel during multicasting of the channel.

27. The method according to claim 25, wherein the region-based parameter of the programming schedule is indicative of specific regions on the on-screen view of the channel where the plurality of graphics and the associated content are required to be overlaid on the on-screen view of the channel during multicasting of the channel, and wherein the specific regions on the on-screen view of the channel correspond to at least the plurality of sections.

28. The method according to claim 24, further comprising utilizing a plurality of automatic content recognition (ACR)-based inline-monitoring devices (IMDs) placed at a plurality of locations in the broadcast chain, to concurrently detect fingerprints of each of the plurality of graphics in the plurality of sections and the fingerprints of the associated content on which the plurality of graphics are overlaid.

29. A non-transitory computer-readable medium having stored thereon computer-executable instructions which, when executed by one or more processors, cause the one or more processors to execute operations, the operations comprising:

in a graphics verification system that manages verification of content of a channel in a broadcast chain:
partitioning an on-screen view of the channel into a plurality of sections based on an overlay of a plurality of graphics on the on-screen view of the channel;
determining a placement of each of the overlaid plurality of graphics in the plurality of sections with respect to associated content on the on-screen view of the channel,
wherein the placement of each of the overlaid plurality of graphics in the plurality of sections is determined based on a time-based parameter of a programming schedule and a region-based parameter of the programming schedule,
wherein the programming schedule corresponds to the plurality of graphics and the associated content on the on-screen view;
detecting one or more error parameters based on the determined placement of each of the overlaid plurality of graphics in the plurality of sections with respect to the associated content, wherein the one or more error parameters correspond to errors related to positions of the overlaid plurality of graphics on the on-screen view;
removing a first overlaid graphic of the overlaid plurality of graphics on the on-screen view of the channel based on a first graphics identifier (ID) of the first overlaid graphic that is in the programming schedule at a time code for a subsequent content item; and
reinstating the first overlaid graphic on the on-screen view of the channel after a number of video frames based on the detected one or more error parameters,
wherein the number of video frames is associated with the time code for the subsequent content item.

30. The non-transitory computer-readable medium according to claim 29, wherein the plurality of graphics comprises at least one of a channel logo, a sign, a symbol, a text placeholder, full screen graphics, partial screen graphics, text crawl, a rating key, or a ticker.

31. The system according to claim 1, wherein the first content item currently associated with the overlaid plurality of graphics on the on-screen view of the channel is replaced with a second content item retrieved from a content database based on a comparison of fingerprints of the overlaid plurality of graphics detected on the on-screen view of the channel with graphics fingerprints stored in a graphics fingerprint database.

* * * * *